US012441852B2

(12) United States Patent
Urmanova Grootjen et al.

(10) Patent No.: US 12,441,852 B2
(45) Date of Patent: Oct. 14, 2025

(54) NON-POROUS MICROPARTICLES

(71) Applicant: COVESTRO (NETHERLANDS) B.V., Geleen (NL)

(72) Inventors: Antonia Urmanova Grootjen, Geleen (NL); Robert van den Berg Jeths, Geleen (NL); Joseph Petronella Friederichs, Wessem (NL)

(73) Assignee: Covestro (Netherlands) B.V., Geleen (NL)

( * ) Notice: Subject to any disclaimer, the term of this patent is extended or adjusted under 35 U.S.C. 154(b) by 542 days.

(21) Appl. No.: 17/791,138

(22) PCT Filed: Dec. 2, 2020

(86) PCT No.: PCT/EP2020/084273
§ 371 (c)(1),
(2) Date: Jul. 6, 2022

(87) PCT Pub. No.: WO2021/144061
PCT Pub. Date: Jul. 22, 2021

(65) Prior Publication Data
US 2023/0084090 A1    Mar. 16, 2023

(30) Foreign Application Priority Data

Jan. 13, 2020  (EP) .................................... 20151363
Jan. 24, 2020  (EP) .................................... 20153620

(51) Int. Cl.
*C08J 3/12*    (2006.01)
*C08J 3/21*    (2006.01)

(52) U.S. Cl.
CPC ................. *C08J 3/212* (2013.01); *C08J 3/12* (2013.01); *C08J 2367/02* (2013.01)

(58) Field of Classification Search
CPC . C08J 3/212; C08J 3/12; C08J 2367/02; C08J 3/247
USPC .......................................................... 524/80
See application file for complete search history.

(56) References Cited

U.S. PATENT DOCUMENTS

| | | | |
|---|---|---|---|
| 6,562,217 B1 * | 5/2003 | Tanaka .................... | C25D 17/22 205/144 |
| 6,737,467 B1 | 5/2004 | Decker et al. | |
| 8,629,205 B2 | 1/2014 | Fessenbecker et al. | |
| 2004/0110907 A1 | 6/2004 | Weiss et al. | |
| 2010/0004356 A1 * | 1/2010 | Yoshinaga ............ | H01M 4/587 523/400 |
| 2019/0085174 A1 | 3/2019 | Owe et al. | |
| 2021/0002492 A1 * | 1/2021 | Molhoek ................. | B05D 1/06 |

FOREIGN PATENT DOCUMENTS

| | | |
|---|---|---|
| CA | 2134044 A1 | 4/1995 |
| CN | 1476472 A | 2/2004 |
| CN | 1764686 A | 4/2006 |
| CN | 1840583 A | 10/2006 |
| CN | 109071866 A | 12/2018 |
| DE | 102 57 217 | 6/2004 |
| KR | 1020040041128 A | 5/2004 |
| WO | 99/65978 | 12/1999 |
| WO | 2019/170854 | 9/2019 |

OTHER PUBLICATIONS

International Search Report dated Mar. 10, 2021, for PCT/EP2020/084273, 4 pp.
Written Opinion of the International Searching Authority dated Mar. 10, 2021, for PCT/EP2020/084273, 5 pp.
Notification of Transmittal of the International Preliminary Report on Patentability (IPRP) dated May 10, 2021, for PCT/EP2020/084273, including amended sheets, 17 pp.
Notification of Transmittal of the International Preliminary Report on Patentability (IPRP) dated Jun. 2, 2021, for PCT/EP2020/084273, 5 pp.
Philipe Cassagnau et al., "Reactive Processing of Thermoplastic Polymers: A Review of the Fundamental Aspects", International Polymer Processing Journal of the Polymer Processing Society, vol. 22, No. 3, Jul. 2007, 69 pp.

* cited by examiner

*Primary Examiner* — Hannah J Pak
(74) *Attorney, Agent, or Firm* — The Webb Law Firm

(57) ABSTRACT

The invention relates to microparticles and compositions thereof as each of them is described in the specification. The invention further relates to microparticles obtained by a process as described in the specification, compositions thereof. The invention further relates to cured compositions as well as to objects or kits-of-parts comprising the microparticles of the invention and/or the compositions thereof and/or the cured compositions thereof. The invention further relates to the use of the microparticles of the invention and/or the compositions thereof, for lowering the gloss of coatings. The invention further relates to the use of the microparticles of the invention and/or the compositions thereof, for making matte coatings. The invention further relates to the use of the microparticles of the invention and/or the compositions thereof, for making soft-touch coatings. The invention further relates to the use of the microparticles of the invention and/or the compositions thereof, for making matte coatings. The invention further relates to the use of the microparticles of the invention and/or the compositions thereof, for making soft-touch matte coatings. The invention further relates to the use of the microparticles of the invention and/or the compositions thereof, for making 3D-printed objects. The invention further relates to the use of the microparticles of the invention and/or the compositions thereof, for making absorbent and superabsorbent objects.

22 Claims, 3 Drawing Sheets

Schematic representation of typical:
(A) core-shell architecture,
(B) multi-layered architecture,
(C) occluded architecture,
(D) partially engulfed architecture.

(A)

(B)

(C)

(D)

A top-down picture of a Leneta chart 2C [the Leneta chart 2C (overall dimensions of 7-5/8 x 10-1/4 in; 194 x 260 mm) is a black and white sealed opacity chart which is half black and half white].

SEM picture of the inventive microparticles InvMP2 at a magnification of x1800.

NON-POROUS MICROPARTICLES

This application is the U.S. national phase of International Application No. PCT/EP2020/084273 filed Dec. 2, 2020, which designated the U.S. and claims priority to EP 20151363.7 filed Jan. 13, 2020 and EP 20153620.8 filed Jan. 24, 2020, the entire contents of each of which are hereby incorporated by reference.

The invention relates to microparticles and compositions thereof as each of them is described in the specification. The invention further relates to microparticles obtained by a process as described in the specification, compositions thereof. The invention further relates to cured compositions as well as to objects or kits-of-parts comprising the microparticles of the invention and/or the compositions thereof and/or the cured compositions thereof. The invention further relates to the use of the microparticles of the invention and/or the compositions thereof, for lowering the gloss of coatings. The invention further relates to the use of the microparticles of the invention and/or the compositions thereof, for making matte coatings. The invention further relates to the use of the microparticles of the invention and/or the compositions thereof, for making soft-touch coatings. The invention further relates to the use of the microparticles of the invention and/or the compositions thereof, for making matte coatings. The invention further relates to the use of the microparticles of the invention and/or the compositions thereof, for making soft-touch matte coatings. The invention further relates to the use of the microparticles of the invention and/or the compositions thereof, for making 3D-printed objects. The invention further relates to the use of the microparticles of the invention and/or the compositions thereof, for making absorbent and superabsorbent objects.

There is the desire for preparing coatings from aqueous coating compositions which coatings combine low gloss 60° and good—preferably very good, more preferably excellent—chemical resistance in aggressive organic solvents such as ethanol. In other words, there is the desire for preparing matte coatings from aqueous coating compositions which coatings have good—preferably very good, more preferably excellent—chemical resistance in aggressive organic solvents such as ethanol. However, the preparation of coatings from aqueous coating compositions having a combination of low gloss 60° and good—preferably very good, more preferably excellent—chemical resistance in aggressive organic solvents such as ethanol, is particularly challenging.

It is therefore the object of the invention to provide for a solution to the above-mentioned desire, that is a solution for preparing coatings from aqueous coating compositions which coatings combine low gloss60° and good—preferably very good, more preferably excellent—chemical resistance in aggressive organic solvents such as ethanol.

This object was surprisingly achieved by the use of the microparticles as described in the claims and as disclosed in the specification.

More particularly, when the microparticles of the invention were used in aqueous coating compositions, the latter afforded—upon curing—matte coatings having at least good chemical resistance in ethanol.

P. Cassagnau et al. disclosed certain aspects of the reactive processing of thermoplastic polymers in the paper entitled 'Reactive Processing of Thermoplastic Polymers: A review of the fundamental aspects' Intern. Polymer Processing (vol. 22, no. 3, pp. 218-258, 1 Jul. 2007; Carl Hanser Verlag, Munich). Each of the WO 2019/170854 A1 to DSM IP Assets BV, the US 2004/0110907 A1 to Degussa AG (equivalent to EP 1426423 A1 and to DE 10257217 A1) and the WO 99/65978 A1 to Eastman Chemical Company, disclosed powder coating compositions and powder coatings. However, neither the WO 2019/170854 A1 nor the US 2004/0110907 A1, nor the WO 99/65978 A1 nor P. Cassagnau's paper, disclosed the microparticles of the present invention, let alone microparticles in aqueous coating compositions since each one of them was silent also as to aqueous coating compositions. Obviously none of them was concerned with aqueous coating compositions, let alone providing a solution to the above mentioned problem that is the preparation of coatings from aqueous coating compositions which coatings combine low gloss60° and good— preferably very good, more preferably excellent—chemical resistance in aggressive organic solvents such as ethanol.

The microparticles of the invention may also have an array of further inventive uses depending on the way and the type of compositions or processes that they may be used. For example, the use of the microparticles of the invention in coating compositions may also provide coatings which may have good hardness, and/or good stain resistance. Further examples of inventive uses of the microparticles of the invention are their use in preparing materials with high water absorbance (known in the art as super-absorbents), in compositions suitable for 3D printing and in preparing 3D printed articles.

The microparticles of the invention constitute a major technological advancement for a number of industries where particulate materials, powders or bulk solids are used widely, since they offer an variety of inventive advantages over the state-of-the-art. Exemplary industries include but are not limited the food processing, pharmaceutical, biotechnology, oil chemical, mineral processing, metallurgical, detergent, power generation, paints, plastics, 3D-printing, household, toiletries, and cosmetics industries.

Broadly in accordance with the invention, there are provided microparticles as described in the claims and as disclosed in the specification.

Broadly in accordance with the invention, there are provided compositions comprising the microparticles of the invention, as described in the claims and as disclosed in the specification.

Broadly in accordance with the invention, there are provided cured compositions comprising the microparticles of the invention, as described in the claims and as disclosed in the specification.

Broadly in accordance with the invention, there are provided an object or a kit-of-parts comprising:
i) The microparticles of the invention, and/or
ii) a composition as disclosed in the specification, and/or
iii) a cured composition as disclosed in the specification.

Broadly in accordance with the invention, there is provided a process making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, storage energy devices, wherein the method comprises the step of providing microparticles as disclosed in the specification, and/or compositions as disclosed in the specification, and/or cured compositions as disclosed in the specification, and/or objects as disclosed in the specification, and/or a kit-of-parts as disclosed in the specification.

Broadly in accordance with the invention, there is provided a use of:

i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification, in paints, coatings, films, adhesives, waxes, matting agents, absorbents, 3D-printing, automotive applications, marine applications, aerospace applications, medical applications, defense applications, sports/recreational applications, architectural applications, bottling applications, household applications, machinery applications, can applications, coil applications, textile applications, electrical applications, and energy applications.

Broadly in accordance with the invention, there is provided a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification, in paints, coatings, films, adhesives, waxes, matting agents, absorbents, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

Broadly in accordance with the invention, there is provided a use of:
i) microparticles as disclosed in the specification, and/or
ii) compositions as disclosed in the specification, and/or
iii) cured compositions as disclosed in the specification, and/or
iv) a kit-of-parts as disclosed in the specification, for lowering the gloss of coatings.

Broadly in accordance with the invention, there is provided a use of:
i) microparticles as disclosed in the specification, and/or
ii) compositions as disclosed in the specification, and/or
iii) cured compositions as disclosed in the specification, and/or
iv) a kit-of-parts as disclosed in the specification,
for making matte coatings.

Broadly in accordance with the invention, there is provided a use of:
i) microparticles as disclosed in the specification, and/or
ii) compositions as disclosed in the specification, and/or
iii) cured compositions as disclosed in the specification, and/or
iv) a kit-of-parts as disclosed in the specification,
for making soft-touch coatings.

Broadly in accordance with the invention, there is provided a use of:
i) microparticles as disclosed in the specification, and/or
ii) compositions as disclosed in the specification, and/or
iii) cured compositions as disclosed in the specification, and/or
iv) a kit-of-parts as disclosed in the specification,
for making 3D-printed objects.

Broadly in accordance with the invention, there is provided a use of:
i) microparticles as disclosed in the specification, and/or
ii) compositions as disclosed in the specification, and/or
iii) cured compositions as disclosed in the specification, and/or
iv) a kit-of-parts as disclosed in the specification,
for making absorbent and superabsorbent objects.

A1a Broadly in accordance with the invention there are provided microparticles according to the claim 1.

The following paragraphs A1 to A26 constitute certain explicit preferments of the microparticles according to A1a, as well as certain further explicit aspects of the invention of the microparticles according to A1a. More specifically, the preferments of the microparticles according to A1a include but are not limited to preferments A1 to A13, while the aspects of the invention of the microparticles according to A1a include but are not limited to aspects A14 to A26. Many other variations, combinations or embodiments of the invention will be apparent to those skilled in the art and such variations, combinations and embodiments are contemplated within the scope of the claimed invention. The antecedent basis for certain terms shown in the preferments and in the aspects can be found in preceding preferments or aspects. Any reference to components includes their preferments and preferred ranges as disclosed in the entire specification.

A1 The microparticles according to A1a or any combination derived from the disclosure in section 1, wherein the microparticles:
  a. are non-porous that is to mean that the microparticles have a porosity determined via mercury porosimetry according to ISO 15901-1:2005, of at most 10, preferably at most 9, more preferably at most 8, most especially at most 7, for example at most 6, for examples at most 5, for example at most 4, for example at most 3, for example at most 2, for example at most 1, for example at most 0.95%; and
  b. comprise a thermosetting polymeric network matrix which thermosetting polymeric network matrix comprises building groups selected from the group consisting of ester groups, ether groups, amide groups, urethane groups, and combinations thereof, preferably selected from the group consisting of ester groups, ether groups, amide groups, and combinations thereof, and c. have a random architecture, that is to mean that the microparticles have neither a core-shell architecture, nor a multi-layered architecture, nor an occluded architecture, nor a partially engulfed architecture, nor any combination thereof, and
d. have a particle size distribution with a median particle size by volume Dv50 as determined via laser diffraction according to the ISO 13320:2009, of at least 1 and at most 850, preferably at least 1 and at most 350, more preferably at least 1 and at most 300, even more preferably at least 1 and at most 275, most preferably at least 1 and at most 250, especially at least 1 and at most 200, more especially at least 1 and at most 150, even more especially at least 1 and at most 100, most especially at least 1 and at most 50, for example at least 1 and at most 30 µm, and
e. do not have a melting temperature ($T_m$) as determined via Differential Scanning calorimetry according to the description, and
f. have a glass transition temperature ($T_g$) as determined via rheometry according to the description, of at least 45 and at most 150, preferably at least 50 and at most 150, more preferably at least 55 and at most 150, even more preferably at least 60 and at most 150, most preferably at least 70 and at most 150° C., and
g. have a storage modulus G' at 130° C. as determined via rheometry according to the description, of at least $10^5$ Pa·s and at most $10^9$ Pa·s, and
h. have a rubbery plateau between 130 and 200° C.—as this is defined in the description and as determined via rheometry according to the description-, (that is to mean that the storage modulus G' of the inventive microparticles is constant for a temperature interval range (delta temperature, DT, in ° C.) of 10, preferably 20, more preferably 30, most preferably 40, for example 50° C., wherein the temperature interval range lies within a temperature range of from and including 130 up to and including 200° C., and the temperature interval range is selected with the proviso that the storage modulus G' is higher than the loss modulus G'' throughout the (selected) temperature interval range, and wherein the storage modulus G' of the inventive microparticles may deviate up to at most 5%, and wherein the deviation (%) is calculated by comparing the G' value recorded at the lower temperature end ($G'_{lowT}$) of the temperature interval range to the one recorded at the higher temperature end ($G'_{highT}$) of the temperature interval range according to the equation 1, Deviation (%)=$[[G'_{lowT}-G'_{highT}]/G'_{lowT}]\times 100$(Equation 1), and wherein the temperature interval range lies within a temperature range of from and including 130 up to and including 200° C., and the temperature interval range is selected with the proviso that the storage modulus G' of the inventive microparticles is higher than the loss modulus G'' of the inventive microparticles throughout the (selected) temperature interval range, and
i. have a sphericity $S_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and
j. have an aspect ratio $A_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and
k. have a convexity $C_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and
l. have a Brunauer-Emmett-Teller (BET) specific surface as determined according to the ISO 9277:2010, of at least 0.01 and at most 15, preferably at least 0.02 and at most 10, more preferably at least 0.03 and at most 8, most preferably at least 0.05 and at most 7, especially at least 0.1 and at most 6, for example at least 0.01 and at most 10, for example at least 0.01 and at most 8, for example at least 0.01 and at most 6 m$^2$/g, and
m. have an aerobic char yield at 600° C., as determined via pyrolysis according to the description of at most 70, preferably at most 60, more preferably at most 50, even more preferably at most 40, most preferably at most 30, especially at most 20, more especially at most 15, most especially at most 10, for example at most 9, for example at most 5, for example at most 3, for example at most 2, for example at most 1, for example at most 0.5, for example at most 0.2, for example at most 0.1, for example 0% w/w on microparticles.

A2 The microparticles according to any one of A1a or A1 or any combination derived from the disclosure in section 1, wherein thermosetting polymeric network matrix further comprises functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof.

A3 The microparticles according to A1a or to any one of A1 to A2 or any combination derived from the disclosure in section 1, wherein the microparticles comprise the thermosetting polymeric network matrix in an amount of at least 30 and at most 100% w/w on microparticles, preferably of at least 40 and at most 100, more preferably of at least 50 and at most 100, even more preferably of at least 60 and at most 100, most preferably of at least 70 and at most 100, especially of at least 80 and at most 100, more especially of at least 90 and at most 100, most especially of at least 95 and at most 100, for example of at least 96 and at most 100, for example of at least 97 and at most 100 for example of at least 98 and at most 100, for example of at least 99 and at most 100, for example of at least 99.5 and at most 100% w/w on microparticles, for example the microparticles consist of the thermosetting polymeric network matrix.

A4 The microparticles according to A1a or to any one of A1 to A3 or any combination derived from the disclosure in section 1, wherein the microparticles optionally comprise a pigment in an amount of at most 70 preferably in an amount of at least 1 and at most 70, more preferably at least 5 and at most 60, even more preferably at least 10 and at most 55, most preferably at least 10 and at most 50, especially at least 10 and at most 40% w/w on microparticles.

A5 The microparticles according to A1a or to any one of A1 to A4 or any combination derived from the disclosure in section 1, wherein the thermosetting polymeric network matrix further comprises functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof.

A6 The microparticles according to A1a or to any one of A1 to A5 or any combination derived from the disclosure in section 1, wherein the microparticles
   a. are non-porous that is to mean that the microparticles have a porosity of at most 5, for example at most 4, for example at most 3, for example at most 2, for example at most 1, for example at most 0.95%; and
   f. have a glass transition temperature ($T_g$) of at least 45 and at most 150° C., and
   g. have a storage modulus G' at 130° C. of at least $10^5$ Pa·s and at most $10^8$ Pa·s, and
   i. have a sphericity $S_{50}$ of at least 0.40 and at most 0.80, and
   j. have an aspect ratio $A_{50}$ of at least 0.40 and at most 0.80, and
   k. have a convexity $C_{50}$ of at least 0.40 and at most 0.80, and
   l. have a Brunauer-Emmett-Teller specific surface of at least 0.01 and at most 10, preferably at least 0.01 and at most 9 m$^2$/g, and
   m. have an aerobic char yield at 600° C. of at most 40, most preferably at most 30, especially at most 20, more especially at most 15, most especially at most 10, for example at most 9, for example at most 5, for example at most 3, for example at most 2, for example at most 1, for example at most 0.5, for example at most 0.2, for example at most 0.1, for example 0% w/w on microparticles.

A7 The microparticles according to A1a or to any one of A1 to A6 or any combination derived from the disclosure in section 1, wherein the microparticles have a particle size distribution with a median particle size by volume Dv50 of at least 1 and at most 30 µm, and a $T_g$ of at least 60 and at most 150° C.

A8 The microparticles according to A1a or to any one of A1 to A7 or any combination derived from the disclosure in section 1, wherein the microparticles have a particle size distribution with a median particle size by volume Dv50 of at least 30 and at most 150 µm, a $T_g$ of at least 50 and at most 150° C.

A9 The microparticles according to A1a or to any one of A1 to A8 or any combination derived from the disclosure in section 1, wherein the microparticles have a particle size distribution with a median particle size by volume Dv50 of at least 200 and at most 850 µm, and a $T_g$ of at least 45 and at most 150° C.

A10 The microparticles according to A1a or to any one of A1 to A9 or any combination derived from the disclosure in section 1, wherein the microparticles are obtained by a process wherein the process comprises a reactive melt-extrusion step wherein preferably the reactive melt-extrusion step involves at least a resin (including its preferments) and an agent (including its preferments) as well as their combinations, as each of them is defined in the specification and disclosed in the specification (see in particular section 2 of the specification).

A11 The microparticles according to A1a or to any one of A1 to A9 or any combination derived from the disclosure in sections 1 and/or 2, wherein the microparticles are obtained by a process which process comprises the steps of:
   1. providing a resin which resin has functional groups and an agent which agent is selected from the group consisting of a crosslinker—as this is defined in the specification—and a thermal radical initiator—as this is defined in the specification—, and optionally a pigment—as this is defined in the specification—, and wherein the resin and the agent are selected as such to provide for a thermosetting polymeric network matrix that comprises building groups selected from the group consisting of ester groups, ether groups, amide groups, urethane groups, and combinations thereof, preferably selected from the group consisting of ester groups, ether groups, amide groups, and combinations thereof,
   2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
   3. obtaining the extrudate and cooling the extrudate down to room temperature in order to obtain a solid material that may be particulate, and
   4. optionally chopping the material obtained from step 3 into chips, and
   5. grinding the material obtained from step 3 or the chips obtained from step 4 to afford the microparticles, or alternatively grinding and sieving at the same time the material obtained from step 3 or the chips obtained from step 4 to afford the microparticles, and
   6. optionally sieving the material obtained from step 3 or the chips obtained from step 4 to afford the microparticles, if the step 5 did not include sieving, and
   7. collecting the microparticles.

A12 The microparticles according to A1a or to any one of A1 to A9, or any combination derived from the disclosure in sections 1 and/or 2, wherein the microparticles are obtained by any one of the processes mentioned in the specification as Process A1, Process A2, Process A3, Process A4, Process A5, Process A6, Process A7, Process A8 Process A9 Process A10, Process A11, Process A12, Process A13 (see section 2 of the specification).

A13 The microparticles according to A1a or to any one of A1 to A12, or any combination derived from the disclosure in sections 1 and/or 2, wherein:
   i) the resins suitable to prepare the inventive microparticles, are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), carboxylic acid functional saturated polyamide resins, amino functional saturated polyamide resins, carboxylic acid functional saturated poly(ester-amide) resins, hydroxyl functional saturated poly(ester-amide) resins, and mixtures thereof. More preferably, the resins suitable to prepare the inventive microparticles are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), carboxylic acid functional saturated poly(ester-amide) resins, hydroxyl functional saturated poly(ester-amide) resins, and mixtures thereof. Even more preferably, the resins suitable to prepare the inventive microparticles are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), and mixtures thereof. Most preferably the resins suitable to prepare the inventive microparticles are selected from the group consisting of carboxylic acid functional saturated polyester resins, carboxylic acid functional saturated acrylic resins, unsaturated polyester resins, unsaturated polyester acrylate resins, vinyl functionalized urethane resins (preferably vinyl ether functionalized urethane resins), and mixtures thereof. Especially the resins suitable to prepare the inventive microparticles are selected from the group consisting of carboxylic acid functional saturated polyester resins, carboxylic acid functional saturated acrylic resins, unsaturated polyester resins, unsaturated polyester acrylate resins, and mixtures thereof. More especially the resins suitable to prepare the inventive microparticles are selected from the group consisting of carboxylic acid functional saturated polyester resins, carboxylic acid functional saturated acrylic resins, unsaturated polyester resins, and mixtures thereof. Most especially the resins suitable to prepare the inventive microparticles are selected from the group consisting of carboxylic acid functional saturated polyester resins, unsaturated polyester resins, and mixtures thereof. For example, the resins suitable to prepare the inventive microparticles are selected from the group consisting of carboxylic acid functional saturated polyester resins, unsaturated polyester resins, and mixtures thereof, and ii) the agents suitable to prepare the inventive microparticles comprising a thermosetting polymeric network matrix which thermosetting polymeric network matrix comprises building groups selected from the group consisting of a crosslinker—as this is defined in the specification—and a thermal radical initiator—as this is defined in the specification, wherein the crosslinker is selected from the group consisting of polyepoxides, non-blocked polyisocyanates—preferably non-blocked isocyanates having an average of 1.5 to 3.5 isocyanate groups per molecule, more preferably a trimer of a non-blocked aliphatic diisocyanate-, blocked polyisocyanates—preferably blocked isocyanates having an average of 1.5 to 3.5 isocyanate groups per molecule, more preferably a trimer of a blocked aliphatic diisocyanate, even more preferably ε-Caprolactam blocked polyisocyanates-, β-hydroxyalkyl-amides, and mixtures thereof, and wherein the thermal radical initiator is selected from the group consisting of organic peroxides and azo polymerization initiators and mixtures thereof; more preferably the thermal radical initiators are organic peroxides.

A14 A composition comprising: i) microparticles according to any one of A1a or A1 to A13, or any combination derived from the disclosure in section 3, and ii) a medium, optionally able to react with at least a functional group—if the latter is present—of the thermosetting polymeric network matrix, and which medium is selected from the group consisting of gases, liquids, solids and combinations thereof, preferably the medium is selected from the group consisting of liquids, solids and combinations thereof, more preferably the medium is a solid, most preferably the medium is a liquid, and wherein the physical state of the medium is assessed at 23° C. and at atmospheric pressure.

A15 The composition according to A14, wherein the composition is a liquid coating composition at 23° C. and at atmospheric pressure, and wherein the medium is a liquid.

A16 The composition according to A14, wherein the composition is an aqueous coating composition at 23° C. and at atmospheric pressure, and wherein the medium comprises water, preferably the medium is water.

A17 A cured composition obtained by curing a composition according to any one of A14 to A16 or any combination derived from the disclosure in section 3.

A18 An object or a kit-of-parts comprising:
i) microparticles according to any one of A1a or A1 to A13, and/or
ii) a composition according to any one of A14 to A16, and/or
iii) a cured composition according to A17.

A19 The object or kit-of-parts according to A18, wherein the object or the kit-of-parts is selected from the group consisting of a film, a 3D-printed object, a container, a textile, a towel, a pad, a bag, and combinations thereof.

A20 A process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, storage energy devices, wherein the method comprises the step of providing microparticles according to any one of A1a or A1 to A13, and/or compositions according to any one of A14 to A16, and/or cured compositions according to A16, and/or objects according to any one of A18 or A19, and/or a kit-of-parts according to any one of A18 or A19.

A21 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
in paints, coatings, films, adhesives, waxes, matting agents, absorbents, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

A22 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
for lowering the gloss of coatings.

A23 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
for making matte coatings.

A24 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
for making soft-touch coatings.

A25 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
for making 3D-printed objects.

A26 Use of:
i) microparticles according to any one of A1a or A1 to A13, and/or
ii) compositions according to any one of A14 to A16, and/or
iii) cured compositions according to A17, and/or
iv) objects according to A18 or A19, and/or
v) a kit-of-parts according to A18 or A19,
for making absorbent and superabsorbent objects.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in any one of A1a or A1 to A26, shown above can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

All combinations of minimum and maximum values of the parameters disclosed in the specification may be used to define the parameter ranges for various preferments or embodiments of the invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in sections 1, 2, 3, 4 and 5 can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in sections 1, 2, 3, 4 and 5 can be combined with each other and with the any feature, element, component, embodiment, aspect, range and especially any preferred feature, preferred element, preferred embodiment, preferred aspect, preferred range, preferred combination of ranges, preferments, embodiments and aspects of the invention as these are disclosed in paragraphs A1a, and A1 to A26.

Definitions

Figure 1:
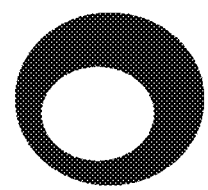
FIG. 1 illustrates schematic representations of typical: (A) core-shell architecture; (B) multi- layered architecture, (C) occluded architecture and (D) partially engulfed architecture.
Figure 1:
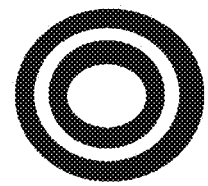
Figure 1:
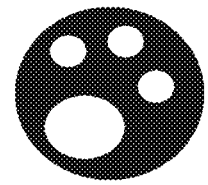
Figure 1:
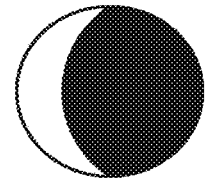

By 'microparticles' is meant in the specification particles of any shape having a particle size distribution with a median particle size by volume Dv50 as determined according to the ISO 13320:2009, of at least 1 and at most 850 μm.

By 'non-porous microparticles' (or equally that microparticles are non-porous) is meant in the specification microparticles that have a porosity determined via mercury porosimetry according to ISO 15901-1:2005, of at most 10, preferably at most 9, more preferably at most 8, most especially at most 7, for example at most 6, for examples at most 5, for example at most 4, for example at most 3, for example at most 2, for example at most 1, for example at most 0.95%.

By 'porous microparticles' (or equally that microparticles are porous) is meant in the specification microparticles that have a porosity—determined as disclosed in the specification—of higher than 10%.

Porosity is a measure of the void spaces in a microparticle and is a fraction of the volume of voids over the total volume typically expressed as percentage between—and including—0 up to and including 100%. The porosity is determined via mercury porosimetry according to ISO 15901-1:2005.

By 'inventive microparticles' is meant in the specification the microparticles of the invention—or equally the microparticles according to the invention—as these are described in the claims and as disclosed in the specification.

By 'comparative microparticles' is meant in the specification microparticles which are not according to the invention.

By 'inventive compositions' (e.g. inventive aqueous coating compositions) is meant in the specification compositions (e.g. aqueous coating compositions) which are according to the invention.

By 'comparative compositions' (e.g. comparative aqueous coating compositions) is meant in the specification compositions (e.g. aqueous coating compositions) which are not according to the invention.

By 'inventive cured compositions' (e.g. inventive cured coatings) is meant in the specification cured compositions (e.g. cured coatings) which are according to the invention.

By 'comparative cured compositions' (e.g. comparative cured coatings) is meant in the specification cured compositions (e.g. cured coatings) which are not according to the invention.

By 'thermosetting polymeric network matrix' is meant in the specification a crosslinked organic polymer network which is thermosetting, possesses random irreversible chemical crosslinks between the polymer chains of at least one resin, and said crosslinked organic polymer network:
  a) has an aerobic char yield at 600° C.—as this is determined in the specification—of at most 70, preferably at most 60, more preferably at most 50, even more preferably at most 40, most preferably at most 30, especially at most 20, more especially at most 15, most especially at most 10, for example at most 9, for example at most 5, for example at most 3, for example at most 2, for example at most 1, for example at most 0.5, for example at most 0.2, for example at most 0.1, for example 0% w/w on microparticles, and
  b) has a rubbery plateau between 130 and 200° C.—as this is defined and determined in the specification—, and
  c) does not have a melting temperature—as this is determined in the specification-.

In the context of this invention, only if an entity e.g. microparticles, meets any and all of the requirements a) to c) mentioned here above, then said entity is deemed to comprise a thermosetting polymeric network matrix.

By 'core-shell architecture' is meant in the specification a structure having an inner core and an outer shell and wherein this structure consists of two or more immiscible components and comprises at least two-phase domains, one of which (the core) lies within the other(s) that form the out layer(s) [the shell(s)] [see FIG. 1, (A)].

By 'multi-layered architecture' is meant in the specification a structure that consists of two or more immiscible components and comprises at least two-phase domains, with an inner core of one component and with at least two layers of different components [see FIG. 1, (B)].

By 'occluded architecture' is meant in the specification a structure that consists of two or more immiscible components and in which one component forms more than one phase domains within a matrix of another component [see FIG. 1, (C)].

By 'partially engulfed architecture' is meant in the specification a structure that consists of two or more immiscible components and in which one or more components cover(s) most, but not all, of the microparticle surface [see FIG. 1, (D)].

By 'random architecture' is meant in the specification any structure other than a structure selected from the group consisting of core-shell architecture—as this is defined in the specification—, multi-layered architecture—as this is defined in the specification—, occluded architecture—as this is defined in the specification—, partially engulfed architecture—as this is defined in the specification—, and any combination of these architectures thereof. In other words, a 'random architecture' is any structure that is neither a core-shell architecture—as this is defined in the specification—, nor a multi-layered architecture—as this is defined in the specification—, nor an occluded architecture, —as this is defined in the specification—, nor a partially engulfed architecture—as this is defined in the specification—, nor any combination of any one of said architectures.

The characterization of the architecture of a microparticle as: random, or core-shell, or multi-layered, or occluded, or partially engulfed, is carried out by Scanning Electron Microscopy (SEM) as described in the Examples.

By 'functional groups' is meant in the specification a covalently bonded group of atoms within a molecule, such as for example the carboxylic acid group in a carboxylic acid or the hydroxyl group in an alcohol, that determines the chemical behaviour of said compound, are capable of reacting with functional groups of another molecule and are responsible for the characteristic chemical reactions of those molecules. In the case of a carboxylic acid functional polyester resin the functional groups of said polyester resin are predominantly carboxylic acid functional groups that behave as a unit in chemical reactions and said groups are capable of reacting with the functional groups of another molecule, for example a crosslinker such as HHA compounds. Typically, in the case of a carboxylic acid functional polyester resin, the carboxylic acid functional groups are terminal groups (=end-groups) which are located at the end(s) of the polyester resin's macromolecular structure (including terminal groups on side chains which side chains form part of the main and longer—when compared to side chains—macromolecular chain) of each polyester resin molecule. Typically, in the case of a carboxylic acid functional acrylic resin, the carboxylic acid functional groups are distributed along the polymer backbone.

By 'polymer' is meant in the specification a high molecular weight polymer having a number average molecular weight ($M_n$) higher than 20000 Da.

A 'resin' is in the specification understood to have the same meaning as it has to a skilled person in thermosetting polymer chemistry, namely as a low molecular weight polymer having functional groups e.g. carboxylic acid functional groups ( . . . —COOH); the term 'low molecular weight' means a number average molecular weight ($M_n$) of at least 400 Da and at most 20000 Da; preferably, the number of reactive groups per molecule is at least two. The resin is able to crosslink via reactions that involve its functional groups, said reactions are induced by means of heat and/or radiation, ultimately connecting the polymer chains together through the formation of permanent covalent (crosslink) bonds, resulting to a cured resin. For the purpose of this invention, a resin is classified as carboxylic acid functional in case its hydroxyl value (OHV) is lower than its acid value (AV). For the purpose of this invention, a resin is classified as hydroxyl functional in case its acid value is lower than its hydroxyl value. For the purpose of this invention, a resin is classified as amino functional in case its acid value (AV) is lower than its amine value (AMV). For the purpose of this invention the term 'unsaturated' referring to a resin is meant to indicate that the resin comprises ethylenic unsaturations. In the context of this specification, the term 'saturated' (referring to a resin) contrasts with the term 'unsaturated' (referring to a resin); a 'saturated' resin is meant to be construed as it is well-known to one of ordinary skill in the art; for example a 'saturated' resin encompasses resins that may comprise aromatic unsaturation but does not comprise cis- or trans-configured reactive carbon-carbon double bond unsaturation, and does not comprise carbon-carbon triple bond.

By 'ethylenic unsaturation' as used in the specification means cis- or trans-configured reactive carbon-carbon double bond unsaturation and does not include aromatic unsaturation, carbon-carbon triple bond, carbon-heteroatom unsaturation.

By 'ethylenic group' is meant any one of the organic groups shown in Scheme 2F of the specification.

By 'crosslinker' is meant in the specification a compound that is capable of reacting with the functional groups of the resin resulting in the formation of a network with infinite molecular weight.

By 'AV' of a resin for example a polyester resin, is meant the acid value. The AV is determined titrimetrically by the ISO 2114-2000.

By 'OHV' of a resin for example a polyester resin, is meant the hydroxyl value. The OHV is determined titrimetrically by the ISO 4629-2-2016.

By 'AMV' of a resin for example a polyamide resin, is meant the amine value. The AMV is determined by potentiometric titration of samples in glacial acetic acid with 0.1N perchloric acid in glacial acetic acid, according to the ASTM D6979-18.

By '$M_n$' of a resin for example a polyester resin, is meant the number average molecular weight. The $M_n$ is determined using Size Exclusion Chromatography (SEC) as described in the specification.

By '$M_w$' of a resin for example a polyester resin, is meant the number average molecular weight. The $M_n$ is determined using Size Exclusion Chromatography (SEC) as described in the specification.

By 'thermal radical initiators' is meant in the specification organic peroxides and azo polymerization initiators.

By '$T_g$' is meant in the specification the glass transition temperature. The $T_g$ of microparticles is determined using rheometry as described in this specification.

By '$T_m$' is meant in the specification the melting temperature. The $T_m$ of microparticles is determined via DSC as described in this specification. If the microparticles have multiple melting temperatures, then the peak temperature of the melting peak with the largest melting enthalpy is mentioned in this specification as the $T_m$ of the microparticles.

By 'reactive melt-extrusion' (or equally 'reactive extrusion') is meant in the specification, the simultaneous performance in a melt-extruder (which is suitable for and configured for carrying out) of: components conveying, melting, mixing, melt pumping, and also developing and controlling an in-situ chemical reaction that involves at least two of the components—used in the reactive extrusion—which are chemically reactive towards each other ('reactive components').

By 'melt-extrusion' (or equally 'extrusion') is meant in the specification, the simultaneous performance in a melt-extruder (which is suitable for and configured for carrying out) of: components conveying, melting, mixing, and melt pumping.

By 'rubbery plateau' (or equally 'rubbery plateau in the temperature range from and including 130 up to and including 200° C.', or equally 'rubbery plateau between 130 and 200° C.'), is meant in the specification that the storage modulus G' is constant for a temperature interval range (delta temperature, DT, in ° C.) of 10, preferably 20, more preferably 30, most preferably 40, for example 50° C., wherein the temperature interval range lies within a temperature range of from and including 130 up to and including 200° C., and the temperature interval range is selected with the proviso that the storage modulus G' is higher than the loss modulus G" throughout the (selected) temperature interval range. The rubbery plateau is determined via rheometry described in this specification.

By 'the storage modulus G' is constant' is meant in the specification that the storage modulus G' values may deviate up to at most 5%, and wherein the deviation (%) is calculated by comparing the G' value recorded at the lower temperature end ($G'_{lowT}$) of the temperature interval range to the one recorded at the higher temperature end ($G'_{highT}$) of the temperature interval range according to the equation 1, and wherein the temperature interval range lies within a temperature range of from and including 130 up to and including 200° C., and the temperature interval range is selected with the proviso that the storage modulus G' is higher than the loss modulus G" throughout the (selected) temperature interval range.

$$\text{Deviation (\%)} = [[G'_{lowT} - G'_{highT}]/G'_{lowT}] \times 100 \text{(Equation 1)},$$

By 'room temperature' is meant herein 23° C.

By 'atmospheric pressure' is meant in the specification pressure of 1 atm.

By 'standard conditions' is meant in the specification room temperature and atmospheric pressure, collectively.

By 'curing' or 'cure' is meant in the specification the process of becoming 'set' that is to form an irreversibly crosslinked network (the so-called 'cured form' or 'cured composition'), a material that can no longer flow, be melted or dissolved. Herein, the terms 'curing' 'cure' and 'crosslinking' are used interchangeably. the curing may take place either at standard conditions (as these are defined in the specification), or by using heat, or by using pressure, or by applying vacuum, or by irradiation e.g. UV-radiation, or by any combination thereof.

By 'polyester resin' is meant in the specification any resin consisting of polycondensed reacted residues of: i) a polyalcohol constituent wherein the polyalcohol constituent is selected from the group consisting of mono-alcohols, diols and polyols and mixtures thereof, and ii) a polyacid constituent wherein the polyacid constituent is selected from the group consisting of carboxylic acids, carboxylic acid anhydrides, esters of carboxylic acids, and mixtures thereof, and optionally iii) a polyhydroxycarboxylic acid, wherein the polyhydroxycarboxylic acid constituent is selected from the group consisting of monomers having one hydroxyl group and two carboxylic acid groups, monomers having two hydroxyl groups and one carboxylic acid group, monomers having two hydroxyl groups and two carboxylic acid groups, and mixtures thereof, and wherein the constituents are linked via ester bonds, and wherein the resin must contain at least polycondensed reacted residues of: i) at least one diol and at least one dicarboxylic acid, or ii) at least one diol and at least one dicarboxylic acid anhydride, or iii) at least one diol and at least one diester of a dicarboxylic acid, or iv) at least one diol and at least one tricarboxylic acid, or v) at least one diol and at least one tricarboxylic acid anhydride, or vi) at least one diol and at least one triester of a tricarboxylic acid.

By 'acrylic resin' is meant in the specification any resin consisting of reacted residues of acrylic acid and/or methacrylic acid and/or an ester of acrylic acid and/or an ester of methacrylic acid, and/or styrene, and/or acrylonitrile, and/or acrylamide, and/or esters of itaconic acid, and/or itaconic acid, and/or divinyl benzene, and/or methacrylonitrile, and/or vinyl esters and/or vinyl halides, and/or esters of fumaric acid, and/or fumaric acid.

By 'polyester acrylate resin' is meant in the specification any polyester resin which also has reacted residues of acrylic acid and/or methacrylic acid and/or an ester of acrylic acid and/or an ester of methacrylic acid.

By 'polyamide' is meant in the specification any resin with repeating units linked by amide bonds.

By 'poly(ester-amide) resin' is meant in the specification any resin with repeating units which some of them are linked by ester bonds and some others with amide groups.

By "polyol" is meant herein an alcohol having at least 3 hydroxyl groups; preferably the polyol has at least three and at most 10 hydroxyl groups, more preferably the polyol has at least three and at most 8 hydroxyl groups, even more preferably the polyol has at least three and at most 6 hydroxyl groups, most preferably the polyol has at least three and at most 5 hydroxyl groups, especially the polyol has at least three and at most 4 hydroxyl groups, more especially the polyol has three hydroxyl groups or equally the polyol is a triol.

By 'urethane resin' is meant in the specification a resin comprising urethane moieties . . . — NH—(C=O)—O— . . . .

By 'vinyl functionalized urethane resin' is meant in the specification a urethane resin comprising vinyl groups . . . —CH=CH$_2$.

By 'vinyl ether functionalized urethane resin' is meant in the specification a urethane resin comprising vinyl ether groups of the following chemical structure ( 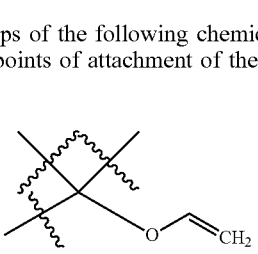 indicates the points of attachment of the vinyl ether group).

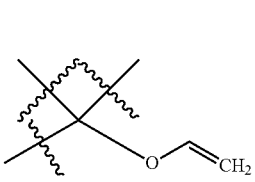

Vinyl ether functionalized resins constitute a (preferred) sub-class of vinyl functionalized urethane resins.

A 'polyepoxide' (also known as 'epoxy resin') is understood to have the same meaning as it has to a skilled person in thermosetting polymer chemistry and includes resins, polydisperse mixtures and compounds, each of which: i) has a number average molecular weight ($M_n$) of at least 150 Da and at most 20000 Da and ii) has an average structure that comprises at least 1.5 (preferably 2) oxirane groups per molecule.

By 'β-hydroxyalkyl-amides' is understood to have the same meaning as it has to a skilled person in thermosetting powder coating compositions (also known as thermosetting powder paints), and includes resins, polydisperse mixtures and compounds, each of which: i) has a number average molecular weight ($M_n$) of at least 150 Da and at most 20000 Da and ii) has an average structure that comprises at least 1.5 (preferably 2) β-hydroxyalkyl-amide groups per molecule.

By 'composition' is meant in the specification the combining and/or mixture of distinct chemical substances and/or components to form a whole.

By 'cured composition' is meant in the specification an object that is obtained by partial or full curing of a composition; said curing may be affected via heat; said object may have any shape, size or form and it can for example be a film, coating; preferably the cured composition is a coating.

By 'coating' is meant in the specification the cured coating composition in the form of a coating. A coating is obtained by curing of a coating composition.

By 'low gloss60°'-referring to a coating—is meant in the specification that the gloss of a coating measured at a 60° angle as described in the specification, is at most 50, preferably at most 49, more preferably at most 48, even more preferably at most 47, most preferably at most 46, especially at most 45, more especially at most 44, even more especially at most 43, most especially at most 42, for example at most 41, for example at most 40.

By 'poor chemical resistance in aggressive organic solvents'-referring to a coating—is meant in the specification that the chemical resistance of a coating measured according to the DIN 68861-1A:2011 in an aqueous solution of ethanol (48 w/w of ethanol in water) for 16 hours, is at most 2 [rating scale 0-5, wherein 5 represents the best performance and 0 represents the worst performance, as the rating scale is disclosed in the specification].

By 'good chemical resistance in aggressive organic solvents'-referring to a coating—is meant in the specification that the chemical resistance of a coating measured according to the DIN 68861-1A:2011 in an aqueous solution of ethanol (48% w/w of ethanol in water) for 16 hours, is 3 [rating scale 0-5, wherein 5 represents the best performance, and 0 represents the worst performance].

By 'very good chemical resistance in aggressive organic solvents'-referring to a coating—is meant in the specification that the chemical resistance of a coating measured according to the DIN 68861-1A:2011 in an aqueous solution of ethanol (48% w/w of ethanol in water) for 16 hours, is 4 [rating scale 0-5, wherein 5 represents the best performance, and 0 represents the worst performance].

By 'excellent chemical resistance in aggressive organic solvents'-referring to a coating—is meant in the specification that the chemical resistance of a coating measured according to the DIN 68861-1A:2011 in an aqueous solution of ethanol (48% w/w of ethanol in water) for 16 hours, is 5 [rating scale 0-5, wherein 5 represents the best performance, and 0 represents the worst performance].

By 'matte coatings' or 'equally low gloss coatings' is meant in the specification a clear coating (also known as non-pigmented coating) having a dry thickness of 35±5 μm on Leneta charts form 2C, that is obtained upon curing for 168 h at standard conditions—as these are defined in the specification—, and the gloss60° is measured on the black part of the chart within 8 h upon the completion of the curing (in other words within 8 h calculated from the end of the 168 h), wherein the clear coating has a gloss60° of at most 50, preferably at most 49, more preferably at most 48, even more preferably at most 47, most preferably at most 46, especially at most 45, more especially at most 44, for example at most 43, for example at most 42, for example at most 41, for example at most 40, as gloss60° is measured according to the specification.

Certain moieties, species, groups, repeat units, compounds, oligomers, polymers, materials, mixtures, compositions and/or formulations which comprise and/or are used in some or all of the invention as described in the specification may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined in the specification.

By 'lower than' is meant in the specification that the relevant maximum boundary value is not included in the range.

By 'higher than' is meant in the specification that the relevant minimum boundary value is not included in the range. By 'rpm' is meant revolutions per minute.

By 'article' is meant in the specification an individual object or item or element of a class designed to serve a purpose or perform a special function and can stand alone; the article can be in any size, form or shape. A substrate is an example of an article. Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fiber cement board, or metal, for example aluminum, copper or steel articles, for instance carbon steel, where the main alloying constituent is carbon. Carbon steel usually contains carbon 0.2 and 1.5 w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin-based compositions, ABS (acrylonitrile butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethylene terephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips. The article can be a domestic furniture, such as tables, chairs, cabinets, bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts, flexible flooring, sporting goods, cosmetics, audio-visual applications, such as TV sets, computer housing, phones, household appliances and satellite dishes.

For all upper and lower boundaries of any parameters given in the specification, the boundary value is included in each range for each parameter. All combinations of minimum and maximum values of the parameters described in the specification may be used to define the parameter ranges for various embodiments and preferences of the invention. In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value. The terms 'effective', 'acceptable', 'active' and/or 'suitable' (for example with reference to any process, use, method, application, preparation, product, material, formulation, compound, composition, monomer, oligomer, polymer precursor, and/or polymers of the present invention and/or described in the specification as appropriate) will be understood to refer to those features of the invention which if used in the correct manner provide the required properties to that which they are added and/or incorporated to be of utility as described in the specification. Such utility may be direct for example where a material has the required properties for the aforementioned uses and/or indirect for example where a material has use as a synthetic intermediate and/or diagnostic tool in preparing other materials of direct utility. As used in the specification these terms also denote that a functional group is compatible with producing effective, acceptable, active and/or suitable end products. The term 'comprising' as used in the specification means that the list that immediately follows is non-exhaustive and may or may not include any other additional suitable items, for example one or more further feature(s), component(s) and/or substituent(s) as appropriate. The term 'comprising' will be used interchangeably with the term 'containing'. The term 'consisting of' as used in the specification mean that the list that follows is exhaustive and does not include additional items. It will be understood that the total sum of any quantities expressed in the specification as percentages cannot (allowing for rounding errors) exceed 100%. However, where a list of components is non-exhaustive, the sum of the percentage for each of such components may be less than 100% to allow a certain percentage for additional amount(s) of any additional component(s) that may not be explicitly described in the specification. Unless the context clearly indicates otherwise, as used in the specification plural forms of the terms in the specification (for example resin, agent, crosslinker, component, minute) are to be construed as including the singular form and vice versa. The decimal separator in numbers (also known as the radix character) is indicated with a period ('.').

1. The Microparticles of the Invention

The microparticles of the invention are as disclosed in the entire specification including the claims and the figures. The terms 'microparticles of the invention' (or alternatively 'inventive microparticles') as used in the specification includes any and all of its preferments, combinations of its features and ranges as well as combinations of any and all of its preferments with any and all of the combinations of its features and ranges. Thus, any and all of the inventive microparticles disclosed in this section 1—and its subsections—includes any and all of their preferments, combinations of their features and ranges as well as combinations of any and all of their preferments with any and all of the combinations of their features and ranges, are collectively referred to—in the entire specification—as the inventive microparticles (or equally the microparticles of the invention). Every and all components of the inventive microparticles are described in detail in section 1.

The inventive microparticles are according to any one of A1a or A1 to A13. More specifically, the microparticles:
a. are non-porous that is to mean that the microparticles have a porosity determined via mercury porosimetry according to ISO 15901-1:2005, of at most 10, preferably at most 9, more preferably at most 8, most especially at most 7, for example at most 6, for examples at most 5, for example at most 4, for example at most 3, for example at most 2, for example at most 1, for example at most 0.95%; and
b. comprise a thermosetting polymeric network matrix which thermosetting polymeric network matrix comprises building groups selected from the group consisting of ester groups, ether groups, amide groups, urethane groups, and combinations thereof, preferably selected from the group consisting of ester groups, ether groups, amide groups, and combinations thereof, and
c. have a random architecture, that is to mean that the microparticles have neither a core-shell architecture, nor a multi-layered architecture, nor an occluded architecture, nor a partially engulfed architecture, nor any combination thereof, and
d. have a particle size distribution with a median particle size by volume Dv50 as determined via laser diffraction according to the ISO 13320:2009, of at least 1 and at most 850, preferably at least 1 and at most 350, more preferably at least 1 and at most 300, even more preferably at least 1 and at most 275, most preferably at least 1 and at most 250, especially at least 1 and at most 200, more especially at least 1 and at most 150, even more especially at least 1 and at most 100, most especially at least 1 and at most 50, for example at least 1 and at most 30 µm, and
e. do not have a melting temperature ($T_m$) as determined via Differential Scanning calorimetry according to the description, and
f. have a glass transition temperature ($T_g$) as determined via rheometry according to the description, of at least 45 and at most 150, preferably at least 50 and at most 150, more preferably at least 55 and at most 150, even more preferably at least 60 and at most 150, most preferably at least 70 and at most 150° C., and g. have a storage modulus G' at 130° C. as determined via rheometry according to the description, of at least $10^5$ Pa·s and at most $10^9$ Pa·s, and h. have a rubbery plateau between 130 and 200° C.—as this is defined in the description and as determined via rheometry according to the description-(that is to mean that the storage modulus G' of the inventive microparticles is constant for a temperature interval range (delta temperature, DT, in ° C.) of 10, preferably 20, more preferably 30, most preferably 40, for example 50° C., wherein the temperature interval range lies within a temperature range of from and including 130 up to and including 200° C., and the temperature interval range is selected with the proviso that the storage modulus G' is higher than the loss modulus G" throughout the (selected) temperature interval range, and wherein the storage modulus G' of the inventive microparticles may deviate up to at most 5%, and wherein the deviation (%) is calculated by comparing the G' value recorded at the lower temperature end ($G'_{lowT}$) of the temperature interval range to the one recorded at the higher temperature end ($G'_{highT}$) of the temperature interval range according to the equation 1, Deviation (%)=$[[G'_{lowT}-G'_{highT}]/G'_{lowT}]\times 100$ (Equation 1), and wherein the temperature interval range lies within a temperature range of from and including 130 up to and including 200° C., and the temperature interval range is selected with the proviso that the storage modulus G' of the inventive microparticles is higher than the loss modulus G" of the inventive microparticles throughout the (selected) temperature interval range, and i. have a sphericity $S_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and j. have an aspect ratio $A_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and k. have a convexity $C_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80, and l. have a Brunauer-Emmett-Teller (BET) specific surface as determined according to the ISO 9277:2010, of at least 0.01 and at most 15, preferably at least 0.02 and at most 10, more preferably at least 0.03 and at most 8, most preferably at least 0.05 and at most 7, especially at least 0.1 and at most 6, for example at least 0.01 and at most 10, for example at least 0.01 and at most 8, for example at least 0.01 and at most 6 m²/g, and m. have an aerobic char yield at 600° C., as determined via pyrolysis according to the description of at most 70, preferably at most 60, more preferably at most 50, even more preferably at most 40, most preferably at most 30, especially at most 20, more especially at most 15, most especially at most 10, for example at most 9, for example at most 5, for example at most 3, for example at most 2, for example at most 1, for example at most 0.5, for example at most 0.2, for example at most 0.1, for example 0% w/w on microparticles.

The inventive microparticles are non-porous that is to mean that the microparticles have a porosity determined via mercury porosimetry according to ISO 15901-1:2005, of at most 10, preferably at most 9, more preferably at most 8, most especially at most 7, for example at most 6, for examples at most 5, for example at most 4, for example at most 3, for example at most 2, for example at most 1, for example at most 0.95%.

The inventive microparticles comprise a thermosetting polymeric network matrix—as this is defined in the specification—which thermosetting polymeric network matrix comprises building groups selected from the group consisting of ester groups, ether groups, amide groups, urethane groups, and combinations thereof, preferably selected from the group consisting of ester groups, ether groups, amide groups, and combinations thereof. The following Schemes 1A to 1D provide a schematic representation of each of these building groups (  indicates a point of attachment of the building group).

Scheme 1A: Ester group as building group

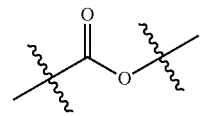

Scheme 1B: Ether group as building group

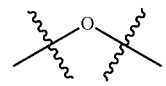

Scheme 1C: Amide group as building group

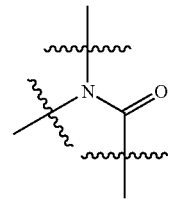

Scheme 1D: Urethane groups as building groups

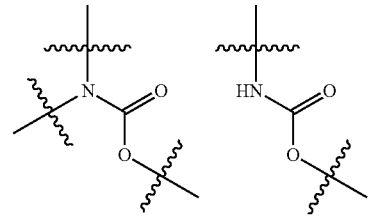

The identification of the building groups of the thermosetting polymeric network matrix of the inventive microparticles is carried out by FTIR (Fourier Transform Infrared) spectroscopy as it is described in the Examples.

The thermosetting polymeric network matrix in the inventive microparticles is identified by:

a) an aerobic char yield at 600° C.—as this is determined in the specification—of at most 70, preferably at most 60, more preferably at most 50, even more preferably at most 40, most preferably at most 30, especially at most 20, more especially at most 15, most especially at most 10, for example at most 9, for example at most 5, for example at most 3, for example at most 2, for example at most 1, for example at most 0.5, for example at most 0.2, for example at most 0.1, for example 0% w/w on microparticles, and b) the presence of a rubbery plateau between 130 and 200° C.—as this is defined and determined in the specification—, and c) the lack of a melting temperature—as this is determined in the specification-.

The thermosetting polymeric network matrix may optionally further comprise functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof. The following Schemes 2A to 2F provide a schematic representation of each of these functional groups ( $\frac{\xi}{\xi}$ indicates a point of attachment of the functional group).

Scheme 2A: Hydroxyl group as functional group

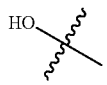

Scheme 2B: Carboxyl group as functional group

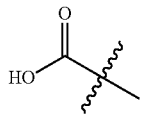

Scheme 2C: Amino groups as functional groups (R is a hydrocarbyl)

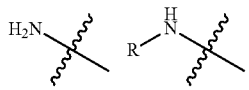

Scehem 2D: Isocyanate group as functional group

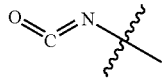

Scheme 2E: Epoxy group as functional groups

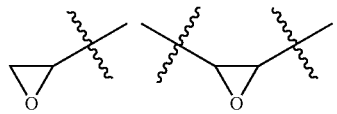

Scheme 2F: Ethylenic groups as functional groups

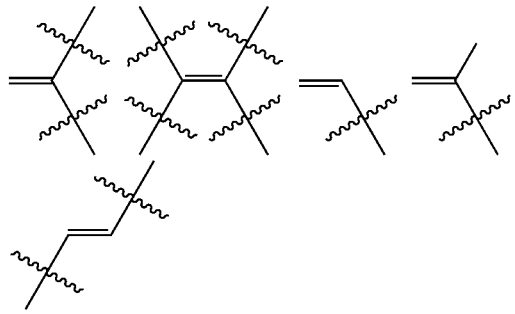

The identification of the functional groups—if present—of the thermosetting polymeric network matrix is carried out by FTIR (Fourier Transform Infrared) spectroscopy as it is described in the Examples.

The structural and the functional properties of the inventive microparticles can be controlled by the chemical composition and the stoichiometry of the starting materials.

The inventive microparticles have a random architecture, that is to mean that the microparticles have neither a core-shell architecture, nor a multi-layered architecture, nor an occluded architecture, nor a partially engulfed architecture, nor any combination thereof.

The inventive microparticles have a particle size distribution with a median particle size by volume Dv50 as determined via laser diffraction according to the ISO 13320:2009, of at least 1 and at most 850, preferably at least 1 and at most 350, more preferably at least 1 and at most 300, even more preferably at least 1 and at most 275, most preferably at least 1 and at most 250, especially at least 1 and at most 200, more especially at least 1 and at most 150, even more especially at least 1 and at most 100, most especially at least 1 and at most 50, for example at least 1 and at most 30 μm.

The inventive microparticles have a glass transition temperature ($T_g$) as determined via rheometry according to the description, of at least 45 and at most 150, preferably at least 50 and at most 150, more preferably at least 55 and at most 150, even more preferably at least 60 and at most 150, most preferably at least 70 and at most 150° C.

The inventive microparticles do not have a melting temperature.

The inventive microparticles have a storage modulus G' at 130° C. as determined via rheometry according to the description, of at least $10^5$ Pa·s and at most $10^9$ Pa·s.

The inventive microparticles have a rubbery plateau (or equally 'rubbery plateau in the temperature range from and including 130 up to and including 200° C.', or equally 'rubbery plateau between 130 and 200° C.'), as this is defined in the specification. This means that the storage modulus G' of the inventive microparticles is constant for a temperature interval range (delta temperature, DT, in ° C.) of 10, preferably 20, more preferably 30, most preferably 40, for example 50° C., wherein the temperature interval range lies within a temperature range of from and including 130 up to and including 200° C., and the temperature interval range is selected with the proviso that the storage modulus G' is higher than the loss modulus G" throughout the (selected) temperature interval range. The rubbery plateau is determined via rheometry described in this specification. The presence of the rubbery plateau is indicative of the presence of a thermosetting polymeric network matrix in the inventive microparticles.

By 'the storage modulus G' is constant' (referring to the inventive microparticles) is meant in the specification that the storage modulus G' values of the inventive microparticles may deviate up to at most 5%, and wherein the deviation (%) is calculated by comparing the G' value recorded at the lower temperature end ($G'_{lowT}$) of the temperature interval range to the one recorded at the higher temperature end ($G'_{highT}$) of the temperature interval range according to the equation 1, and wherein the temperature interval range lies within a temperature range of from and including 130 up to and including 200° C., and the temperature interval range is selected with the proviso that the storage modulus G' of the inventive microparticles is higher than the loss modulus G" of the inventive microparticles throughout the (selected) temperature interval range.

$$\text{Deviation (\%)}=[[G'_{lowT}-G'_{highT}]/G'_{lowT}]\times 100 \quad \text{(Equation 1)}.$$

In the other words the inventive microparticles have a rubbery plateau between 130 and 200° C.—as this is defined in the description and as determined via rheometry according to the description-, and that is to mean that the storage modulus G' of the inventive microparticles is constant for a temperature interval range (delta temperature, DT, in ° C.) of 10, preferably 20, more preferably 30, most preferably 40, for example 50° C., wherein the temperature interval range lies within a temperature range of from and including 130 up to and including 200° C., and the temperature interval range is selected with the proviso that the storage modulus G' is higher than the loss modulus G" throughout the (selected) temperature interval range, and wherein the storage modulus G' of the inventive microparticles may deviate up to at most 5%, and wherein the deviation (%) is calculated by comparing the G' value recorded at the lower temperature end ($G'_{lowT}$) of the temperature interval range to the one recorded at the higher temperature end ($G'_{highT}$) of the temperature interval range according to the equation 1, $$\text{Deviation (\%)}=[[G'_{lowT}-G'_{highT}]/G'_{lowT}]\times 100 \quad \text{(Equation 1)},$$

and wherein the temperature interval range lies within a temperature range of from and including 130 up to and including 200° C., and the temperature interval range is selected with the proviso that the storage modulus G' of the inventive microparticles is higher than the loss modulus G" of the inventive microparticles throughout the (selected) temperature interval range.

The inventive microparticles have a sphericity $S_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80.

The inventive microparticles have an aspect ratio $A_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80.

The inventive microparticles have a convexity $C_{50}$ as determined according to the ISO 13322-2:2006 of at least 0.05 and at most 0.95, preferably at least 0.15 and at most 0.93, more preferably at least 0.20 and at most 0.90, even more preferably at least 0.30 and at most 0.85, most preferably at least 0.40 and at most 0.80.

The inventive microparticles have a Brunauer-Emmett-Teller (BET) specific surface as determined according to the ISO 9277:2010, of at least 0.01 and at most 15, preferably at least 0.02 and at most 10, more preferably at least 0.03 and at most 8, most preferably at least 0.05 and at most 7, especially at least 0.1 and at most 6, for example at least 0.01 and at most 10, for example at least 0.01 and at most 8, for example at least 0.01 and at most 6 $m^2/g$.

The inventive microparticles have an aerobic char yield at 600° C., as determined via the Pyrolysis Method according to the description of at least 0 and at most 70, preferably at least 0 and at most 60, more preferably at least 0 and at most 50, even more preferably at least 0 and at most 40, most preferably at least 0 and at most 30, especially at least 0 and at most 20, more especially at least 0 and at most 15, most especially at least 0 and at most 10, for example at least 0 and at most 9, for example at least 0 and at most 5, for example at least 0 and at most 3, for example at least 0 and at most 2, for example at least 0 and at most 1, for example at least 0 and at most 0.5, for example at least 0 and at most 0.2, for example 0% w/w on (inventive) microparticles.

The inventive microparticles may optionally (further) comprise a pigment in an amount of at least 0 and at most 70, preferably at least 0 and at most 60, more preferably at least 0 and at most 50, even more preferably at least 0 and at most 40% w/w on (inventive) microparticles.

If a pigment is present in the inventive microparticles, then preferably the pigment is present in an amount of at least 1 and at most 70, more preferably at least 1 and at most 60, even more preferably at least 1 and at most 50, most preferably at least 1 and at most 40% w/w on (inventive) microparticles. The pigment may be one or a combination of white pigment, color pigment, inert pigment, and functional pigment, as each of them are described in the entire specification.

Pigments are insoluble fine particle size materials used in coatings to provide color, to hide substrates, and/or to reduce cost. Pigments are insoluble materials used as colloidal dispersions. The pigments are typically offered as a dry powder of aggregates.

Pigments are divided into four broad classes: white, color, inert and functional pigments. Consequently, the pigment may be selected from the group consisting of white pigments, color pigments, inert pigments, functional pigments, and mixtures thereof.

White pigments include but are not limited to $TiO_2$ (titanium dioxide), white lead [basic lead carbonate $2PbCO_3 \cdot Pb(OH)_2$], zinc oxide (ZnO), zinc sulfide (ZnS), lithopone ($ZnS/BaSO_4$). The $TiO_2$ is one of the most important pigments used in coatings, and it comes in two different crystal types: rutile and anatase. A variety of $TiO_2$ pigments is offered by each $TiO_2$ manufacturer. Suitable examples of commercially available $TiO_2$ (titanium dioxide) suitable as white pigments in coatings are available commercially from Kronos Titan GmbH under certain trade names using the registered trademark Kronos® such as Kronos® 2360 (which is a typical white pigment widely used in coatings), Kronos® 2310, Kronos® 2300, Kronos® 2190, Kronos® 2160, Kronos® 2066, Kronos® 2064, Kronos® 2056, Kronos® 2047, Kronos® 2044, Kronos® 2043, Kronos® 4045, Kronos® 4311.

Color pigments include but are not limited to:

i) (inorganic and organic) yellow and orange pigments, such as iron oxide yellows [FeO(OH)] that are low chroma brownish-yellow pigments, chrome yellow pigments, medium chrome yellow pigments such as lead chromate ($PbCrO_4$), redder yellows (cocrystals of lead chromate with PbO), primrose yellow and lemon yellows (cocrystals of lead chromate with lead sulfate), molybdate oranges [cocrystals of lead chromate with lead molybdate ($PbMoO_4$) and lead sulfate], titanium yellows, organic oranges and yellows e.g. diarylide yellows (bisazo pigments derived from 3,3'-dichlorobenzidene (PY 13), monoarylide (monoazo) yellow pigments such as PY 74, nickel azo yellow (PG 10), vat yellow pigments e.g. isoindoline yellow PY139, benzimidazolone orange pigments e.g. PO36, and ii) (inorganic and organic) red pigments e.g. $Fe_2O_3$, tolouidine red pigment, PR3 bright red azo pigment (azo derivative of β-naphthol), permanent Red 2B red azo pigment (available as the calcium, barium or manganese salt), naphthol reds (azo pigments with various ring substituents (Cl, $—OCH_3$, $NO_2$), quinacridone pigments, iii) (inorganic and organic) blue and green pigments, e.g. iron blue, ferric ammonium ferrocyanide [$FeNH_4Fe(CN)_6$], copper phthalocyanine (CPC) pigments (known also as phthalo blue and phthalo green), and iv) black pigments e.g. carbon blacks, metallic pigments such as aluminum flake pigments, bronze flake pigments, nickel flake pigments, stainless steel flake pigments, interference pigments which are flake pigments that lead to color by interference e.g. pearlescent pigments platelets of mica having thin surface treatment layers of $TiO_2$ or $Fe_2O_3$.

Inert pigments known also as inerts, fillers, or extenders, are typically inexpensive and are used to reduce the cost of a coating. Inert pigments include but are not limited to synthetic calcium carbonate ($CaCO_3$), calcium carbonate derived from ground limestone or dolomite, clays (aluminum silicates), magnesium silicate minerals, silicon dioxide, barytes (barium sulfate).

Functional pigments include but are not limited to complex zinc chromate pigments, red lead, zinc phosphate, zinc oxide, cuprous oxide, organotin pigments, antimony oxide.

The inventive microparticles may optionally (further) comprise—(in addition to the thermosetting polymeric network matrix, or in addition to the thermosetting polymeric network matrix and the pigment), other components, such as waxes, and/or the usual (processing) additives, for example degassing agents, smoothness, appearance enhancing agents or (light) stabilizers. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO 02/50194.

The inventive microparticles may be designed in such a way (for example via the use of any one of the processes disclosed in this specification) to suit a variety of end-applications. For example, the inventive microparticles may be non-functionalized (this is to mean that have no or very few functional groups), or functionalized (this is to mean that have a significant number of functional groups). Non-functionalized inventive microparticles are typically suitable for end-application which demand low or no interaction between the inventive microparticles with the rest of the components that make up compositions or articles suitable for an end-application that would require such performance from the end of the inventive microparticles. Functionalized inventive microparticles are capable of being further reacted and/or having their initial functionality(ies) further modified via chemical reaction and/or chemical interactions with the rest of the components that make up compositions or articles suitable for an end-application that would require such performance from the end of the inventive microparticles. For example, once prepared the inventive microparticles may be further functionalized via chemical reaction with fatty acids, fluorine-containing compounds, phosphorous-containing compounds, silicon-containing compounds (e.g. silanes, siloxanes, silicones), polyethylene glycol, polypropylene glycol, in order for example to enhance or reduce dispersibility, and/or to enhance or reduce water repellence. The desired function of the inventive microparticles that may be required in an end-application, may be fine-tuned by—for example—choosing the stoichiometry between the reactive components, the kind of the reactive components, the type of the functional groups of the reactive components. Functionalized inventive microparticles may also react with the same via chemical reaction and/or chemical interactions with the same; heat and/or pressure and/or vacuum and/or irradiation e.g. UV-radiation, or any combination thereof, may be used.

Suitable resins (including their preferments), and agents (including their preferments) as well as their combinations, that are particularly suitable for preparing the inventive microparticles are disclosed in section 2 of the specification and also in other parts of the entire specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1—and its subsections-, can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

2. Processes for Making the Inventive Microparticles

The inventive microparticles are prepared via (or equally obtained by) a process wherein the process comprises a reactive melt-extrusion step (or also known as 'reactive extrusion' step). Reactive extrusion consists in using an extruder (which is suitable for and appropriately configured for) as a continuous chemical reactor [Xanthos M. Reactive Extrusion: Principles and Practice, Hanser, Munich (1992); Baker, W., Scott, C., Hu, G. H. Reactive Polymer Blending, Hanser, Munich (2001); Cassagnau, P., Bounor-Legare', V., Fenouillot, F. Intern Polym Proc., 2007, 22, 218-258]. More particularly, a reactive extrusion (step) consists in using an extruder (which is suitable for and configured) for performing simultaneously components conveying, melting, mixing, melt pumping, and also developing and controlling an in-situ chemical reaction that involves at least two of the components—used in the reactive extrusion—which are chemically reactive towards each other ('reactive components'). Contrary to a reactive extrusion, a typical melt-extrusion consists in using an extruder for components conveying, melting, mixing, and melt pumping. The in-situ chemical reaction which takes place during the reactive extrusion is conducted in the melt, thus no solvent is required. In the processes disclosed in this section, the step 2 in all of the disclosed processes disclosed in this specification, is the reactive melt-extrusion step.

The inventive microparticles may be designed in such a way (for example via the use of any one of the processes disclosed in this specification) to suit a variety of end-applications. For example, the inventive microparticles may be non-functionalized (this is to mean that have no or very few functional groups), or functionalized (this is to mean that have a significant number of functional groups). Non-functionalized inventive microparticles are typically suitable for end-application which demand low or no interaction between the inventive microparticles with the rest of the components that make up compositions or articles suitable for an end-application that would require such performance from the end of the inventive microparticles. Functionalized inventive microparticles are capable of being further reacted and/or having their initial functionality(ies) further modified via chemical reaction and/or chemical interactions with the rest of the components that make up compositions or articles suitable for an end-application that would require such performance from the end of the inventive microparticles. For example, once prepared the inventive microparticles may be further functionalized via chemical reaction with fatty acids, fluorine-containing compounds, phosphorous-containing compounds, silicon-containing compounds (e.g. silanes, siloxanes, silicones), polyethylene glycol, polypropylene glycol, in order for example to enhance or reduce dispersibility, and/or to enhance or reduce water repellence. The desired function of the inventive microparticles that may be required in an end-application, may be fine-tuned by—for example choosing the stoichiometry between the reactive components, the kind of the reactive components, the type of the functional groups of the reactive components.

The inventive microparticles are prepared via (or equally obtained by) a process wherein the process comprises a reactive melt-extrusion step, wherein preferably the reactive melt-extrusion step involves at least a resin (including its preferments) and an agent (including its preferments) as well as their combinations, as each of them is defined in the specification and disclosed in this section. For brevity the aforementioned process is mentioned in the specification as 'Process A1'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment—as this is defined in the specification—, and wherein the resin and the agent are selected as such to provide for a thermosetting polymeric network matrix that comprises building groups selected from the group consisting of ester groups, ether groups, amide groups, urethane groups, and combinations thereof preferably selected from the group consisting of ester groups, ether groups, amide groups, and combinations thereof,
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles.

For brevity the aforementioned process is mentioned in the specification as 'Process A2'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment—as this is defined in the specification—, and wherein the resin and the agent are selected as such to provide for a thermosetting polymeric network matrix that comprises building groups selected from the group consisting of ester groups, ether groups, amide groups, urethane groups, and combinations thereof preferably selected from the group consisting of ester groups, ether groups, amide groups, and combinations thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles. and
8. curing the collected inventive microparticles, and
9. collecting the cured inventive microparticles.

For brevity the aforementioned process is mentioned in the specification as 'Process A3'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the resin and the agent are selected as such to provide for a thermosetting polymeric network matrix that comprises building groups selected from the group consisting of ester groups, ether groups, amide groups, urethane groups, and combinations thereof preferably selected from the group consisting of ester groups, ether groups, amide groups, and combinations thereof,
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles.

For brevity the aforementioned process is mentioned in the specification as 'Process A4'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the resin and the agent are selected as such to provide for a thermosetting polymeric network matrix that comprises building groups selected from the group consisting of ester groups, ether groups, amide groups, urethane groups, and combinations thereof, preferably selected from the group consisting of ester groups, ether groups, amide groups, and combinations thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles. and
8. curing the collected inventive microparticles, and
9. collecting the cured inventive microparticles.

For brevity the aforementioned process is mentioned in the specification as 'Process A5'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the total amount of the resin and the agent is such so as the amount of the thermosetting polymeric network matrix in the inventive microparticles is at least 30 and at most 100, preferably of at least 40 and at most 100, more preferably of at least 50 and at most 100, even more preferably of at least 60 and at most 100, most preferably of at least 70 and at most 100, especially of at least 80 and at most 100, more especially of at least 90 and at most 100, most especially of at least 95 and at most 100, for example of at least 96 and at most 100, for example of at least 97 and at most 100 for example of at least 98 and at most 100, for example of at least 99 and at most 100, for example of at least 99.5 and at most 100% w/w on microparticles, for example the microparticles consist of the thermosetting polymeric network matrix, and wherein the resin and the agent are selected as such to provide for a thermosetting polymeric network matrix that comprises building groups selected from the group consisting of ester groups, ether groups, amide groups, urethane groups, and combinations thereof, preferably selected from the group consisting of ester groups, ether groups, amide groups, and combinations thereof, and 2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles.

For brevity the aforementioned process is mentioned in the specification as 'Process A6'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the total amount of the resin and the agent is such so as the amount of the thermosetting polymeric network matrix in the inventive microparticles is at least 30 and at most 100, preferably of at least 40 and at most 100, more preferably of at least 50 and at most 100, even more preferably of at least 60 and at most 100, most preferably of at least 70 and at most 100, especially of at least 80 and at most 100, more especially of at least 90 and at most 100, most especially of at least 95 and at most 100, for example of at least 96 and at most 100, for example of at least 97 and at most 100 for example of at least 98 and at most 100, for example of at least 99 and at most 100, for example of at least 99.5 and at most 100% w/w on microparticles, for example the microparticles consist of the thermosetting polymeric network matrix, and wherein the resin and the agent are selected as such to provide for a thermosetting polymeric network matrix that comprises building groups selected from the group consisting of ester groups, ether groups, amide groups, urethane groups, and combinations thereof, preferably selected from the group consisting of ester groups, ether groups, amide groups, and combinations thereof, and 2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and 4. optionally chopping the material obtained from step 3 into chips, and 5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and 6. optionally sieving the material obtained from step 3 or the chips obtained from step 4 to afford the inventive microparticles, if the step 5 did not include sieving, and 7. collecting the inventive microparticles. and 8. curing the collected inventive microparticles, and 9. collecting the cured inventive microparticles.

For brevity the aforementioned process is mentioned in the specification as 'Process A7'.

The inventive microparticles are prepared via (or equally obtained by) a process comprising the steps of:

1. providing a resin which resin has functional groups and an agent which agent is selected from the group consisting of a crosslinker—as this is defined in the specification—and a thermal radical initiator—as this is defined in the specification—, and optionally a pigment—as this is defined in the specification—, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and 2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and 4. optionally chopping the material obtained from step 3 into chips, and 5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and 6. optionally sieving the material obtained from step 3 or the chips obtained from step 4 to afford the inventive microparticles, if the step 5 did not include sieving, and 7. collecting the inventive microparticles.

For brevity the aforementioned process is mentioned in the specification as 'Process A8'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment—as this is defined in the specification—, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles. and
8. curing the collected inventive microparticles, and
9. collecting the cured inventive microparticles.

For brevity the aforementioned process is mentioned in the specification as 'Process A9'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and 6. optionally sieving the material obtained from step 3 or the chips obtained from step 4 to afford the inventive microparticles, if the step 5 did not include sieving, and
7. collecting the inventive microparticles.

For brevity the aforementioned process is mentioned in the specification as 'Process A10'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles. and
8. curing the collected inventive microparticles, and
9. collecting the cured inventive microparticles.

For brevity the aforementioned process is mentioned in the specification as 'Process A11'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the total amount of the resin and the agent is such so as the amount of the thermosetting polymeric network matrix in the inventive microparticles is at least 30 and at most 100, preferably of at least 40 and at most 100, more preferably of at least 50 and at most 100, even more preferably of at least 60 and at most 100, most preferably of at least 70 and at most 100, especially of at least 80 and at most 100, more especially of at least 90 and at most 100, most especially of at least 95 and at most 100, for example of at least 96 and at most 100, for example of at least 97 and at most 100 for example of at least 98 and at most 100, for example of at least 99 and at most 100, for example of at least 99.5 and at most 100% w/w on microparticles, for example the microparticles consist of the thermosetting polymeric network matrix, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and
2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and 3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles.

For brevity the aforementioned process is mentioned in the specification as 'Process A12'.

Preferably, the inventive microparticles are prepared via (or equally obtained by) a process comprising the steps of:
1. providing a resin which resin has functional groups and an agent which agent is selected from the group consisting of a crosslinker—as this is defined in the specification—and a thermal radical initiator—as this is defined in the specification—, and optionally a pigment in such an amount so as the amount of pigment in the inventive microparticles is at most 70, preferably at least 1 and at most 70, more preferably at least 5 and at most 60, even more preferably at least 10 and at most 55, most preferably at least 10 and at most 50, especially at least 10 and at most 40% w/w on inventive microparticles—as this is defined in the specification—, and wherein the total amount of the resin and the agent is such so as the amount of the thermosetting polymeric network matrix in the inventive microparticles is at least 30 and at most 100, preferably of at least 40 and at most 100, more preferably of at least 50 and at most 100, even more preferably of at least 60 and at most 100, most preferably of at least 70 and at most 100, especially of at least 80 and at most 100, more especially of at least 90 and at most 100, most especially of at least 95 and at most 100, for example of at least 96 and at most 100, for example of at least 97 and at most 100 for example of at least 98 and at most 100, for example of at least 99 and at most 100, for example of at least 99.5 and at most 100% w/w on microparticles, for example the microparticles consist of the thermosetting polymeric network matrix, and wherein the resin and the agent are selected as such to provide for a thermosetting polymeric network matrix that comprises: i) building groups selected from the group consisting of ester groups, ether groups, amide groups, urethane groups, and combinations thereof, preferably selected from the group consisting of ester groups, ether groups, amide groups, and combinations thereof, and ii) functional groups selected from the group consisting of hydroxyl groups, carboxyl groups, amino groups, isocyanate groups, epoxy groups, ethylenic groups, and any combination thereof, preferably selected from the group consisting of hydroxyl groups, carboxyl groups, epoxy groups, ethylenic groups, and any combination thereof, and 2. introducing the resin, the agent and—if present—the pigment into a melt-extruder (which is suitable for and configured for carrying out a reactive melt-extrusion), and performing a reactive melt-extrusion involving the in-situ chemical reaction between the resin and the agent (reactive components) wherein the reactive melt-extrusion takes place at any temperature or (preferably) range of temperatures of from and including 120 up to and including 200° C. (preferably of from and including 140 up to and including 200, more preferably of from and including 160 up to and including 200, most preferably of from and including 180 up to and including 200° C.), wherein the temperature may be constant or gradually varying, and preferably the average residence time is from and including 10 seconds up to and including 10 minutes more preferably is from and including 15 seconds up to and including 7 minutes, even more preferably is from and including 15 seconds up to and including 5 minutes, even more preferably is from and including 20 seconds up to and including 10 minutes, even more preferably is from and including 20 seconds up to and including 7 minutes, even more preferably is from and including 20 seconds up to and including 5 minutes, for example is from 10 seconds up to and including 7 minutes, for examples is from 20 seconds up to and including 7 minutes, for example is from 30 seconds up to and including 5 minutes, to obtain an extrudate, and
3. obtaining the extrudate and cooling the extrudate down to room temperature in order to obtain a solid material that may be particulate, and
4. optionally chopping the material obtained from step 3 into chips, and
5. grinding the material obtained from step 3 or the chips obtained from step 4 to afford the inventive microparticles, or alternatively grinding and sieving at the same time the material obtained from step 3 or the chips obtained from step 4 to afford the inventive microparticles, and
6. optionally sieving the material obtained from step 3 or the chips obtained from step 4 to afford the inventive microparticles, if the step 5 did not include sieving, and
7. collecting the inventive microparticles. and
8. curing the collected inventive microparticles, and
9. collecting the cured inventive microparticles.

For brevity the aforementioned process is mentioned in the specification as 'Process A13'. For clarity, any one of the Processes A2-A13 represent certain explicit preferments of the Process A1.

The resins (including their preferments), and the agents (including their preferments) disclosed in this section, as well as their combinations, as each of them is defined in the specification and disclosed in this section are particularly suitable for preparing the inventive microparticles and are even more particularly suitable to be used in any one of the Processes A1 to A13 disclosed above.

Preferably, the resins suitable to prepare the inventive microparticles are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), carboxylic acid functional saturated polyamide resins, amino functional saturated polyamide resins, carboxylic acid functional saturated poly(ester-amide) resins, hydroxyl functional saturated poly(ester-amide) resins, and mixtures thereof. More preferably, the resins suitable to prepare the inventive microparticles are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), carboxylic acid functional saturated poly(ester-amide) resins, hydroxyl functional saturated poly(ester-amide) resins, and mixtures thereof. Even more preferably, the resins suitable to prepare the inventive microparticles are selected from the group consisting of carboxylic acid functional saturated polyester resins, hydroxyl functional saturated polyester resins, carboxylic acid functional saturated acrylic resins, hydroxyl functional saturated acrylic resins, unsaturated polyester resins, unsaturated polyester acrylate resins, vinyl functionalized urethane resins (preferably vinyl ether functionalized urethane resins), and mixtures thereof. Most preferably the resins suitable to prepare the inventive microparticles are selected from the group consisting of carboxylic acid functional saturated polyester resins, carboxylic acid functional saturated acrylic resins, unsaturated polyester resins, unsaturated polyester acrylate resins, vinyl functionalized urethane resins (preferably vinyl ether functionalized urethane resins), and mixtures thereof. Especially the resins suitable to prepare the inventive microparticles are selected from the group consisting of carboxylic acid functional saturated polyester resins, carboxylic acid functional saturated acrylic resins, unsaturated polyester resins, unsaturated polyester acrylate resins, and mixtures thereof. More especially the resins suitable to prepare the inventive microparticles are selected from the group consisting of carboxylic acid functional saturated polyester resins, carboxylic acid functional saturated acrylic resins, unsaturated polyester resins, and mixtures thereof. Most especially the resins suitable to prepare the inventive microparticles are selected from the group consisting of carboxylic acid functional saturated polyester resins, unsaturated polyester resins, and mixtures thereof. For example, the resins suitable to prepare the inventive microparticles are selected from the group consisting of carboxylic acid functional saturated polyester resins, unsaturated polyester resins, and mixtures thereof.

Exemplary carboxylic acid functional saturated polyester resins include but are not limited to Uralac® P 831, Uralac® P 4810, Uralac® P 3485, Uralac® P 5070, Uralac® P 3211, Uralac® P 865, Uralac® P 877, Uralac® P 3250 all available by DSM, and the polyester resin PR-2 shown in the Examples.

Exemplary hydroxyl functional saturated polyester resins include but are not limited to Uralac® P 1413, Uralac® P 1420, Uralac® P 1475, Uralac® P 1550, Uralac® P 1580, all available by DSM.

Exemplary carboxylic acid functional saturated acrylic resins include but are not limited to NeoCryl® B-817, NeoCryl® B-818, NeoCryl® B-890, all available by DSM.

Exemplary hydroxyl functional saturated acrylic resins include but are not limited to NeoCryl® B-819, NeoCryl® B-851, NeoCryl® B-859, all available by DSM.

Exemplary unsaturated polyester resins include but are not limited to Uracross® P 755, Uracross® P 754, Uracross® P 752, Uracross® P 3126, Uralac® P1011 R, Uralac® P1021 R, Uralac® P1031 R, Uralac® P1081 R all available by DSM, as well as PALATAL® P6, PALATAL® P69, ATLAC® 5200, ATLAC® PREMIUM 600, BEYONE™ 410-N-01 and BEYONE™ 806-H-01 all available by Aliancys, and the polyester resin PR-1 shown in the Examples.

Exemplary unsaturated polyester acrylate resins include but are not limited to AgiSyn®705, AgiSyn®707, AgiSyn®716, and AgiSyn®720 all available by DSM.

Exemplary vinyl functionalized urethane resins include but are not limited to Uracross® P 3307, Uralac® P1900 C, Uralac® P1910 C, Uralac® P1920 C, all available by DSM. Each of the Uracross® P 3307, Uralac® P1900 C, Uralac® P1910 C, Uralac® P1920 C is a vinyl ether functionalized urethane resin.

Exemplary polyamide resins include but are not limited to those described in US 2008/0226827 A1 in paragraphs [0006]-[0016] and in Experiments 1-8. Exemplary carboxylic acid functional polyamide resins include but are not limited to UNI-REZ™ 2620, UNI-REZ™2721, UNI-REZ™2727, available from Kraton. Exemplary amino functional polyamide resins include but are not limited to UNI-REZ™2638 and UNI-REZ™2678, available from Kraton.

Exemplary carboxylic acid functional saturated poly(ester-amide) resins include but are not limited to those described in US 2002/0035236 A1 in paragraphs [0002]-[0056] and in Experiment 1.

Exemplary hydroxyl functional saturated poly(ester-amide) resins include but are not limited to Hybrane® P 1000, Hybrane® H 1550 [$M_n$=1500 Da (as reported by the supplier); hydroxyl functional], Hybrane® H 1500 and Hybrane® S 1200 [$M_n$=1200 Da (as reported by the supplier); hydroxyl functional] available by Polymer Factory, as well as those described in US 2002/0055609 A1 in paragraphs [0002]-[0060] and in Experiments 1-4.

Preferably, the agents suitable to prepare the inventive microparticles are selected from the group consisting of a crosslinker—as this is defined in the specification—and a thermal radical initiator—as this is defined in the specification-.

Preferably, the crosslinkers suitable to prepare the inventive microparticles, are selected from the group consisting of polyepoxides, non-blocked polyisocyanates—preferably non-blocked isocyanates having an average of 1.5 to 3.5 isocyanate groups per molecule, more preferably a trimer of a non-blocked aliphatic diisocyanate-, blocked polyisocyanates—preferably blocked isocyanates having an average of 1.5 to 3.5 isocyanate groups per molecule, more preferably a trimer of a blocked aliphatic diisocyanate, even more preferably ε-Caprolactam blocked polyisocyanates-, β-hydroxyalkyl-amides, and mixtures thereof.

Exemplary polyepoxides include but are not limited to glycidyl polyepoxides, non-glycidyl aliphatic polyepoxides, non-glycidyl cycloaliphatic polyepoxides glycidyl-ether polyepoxides, glycidyl-ester polyepoxides, glycidyl-amino polyepoxides, novolac polyepoxides (also known as glycidyl ethers of phenolic novolac resins), diglycidyl ether of bisphenol-A, ISOCRYL®EP-570G (which is a glycidyl-functional acrylic hardener) available by Estron Chemical, Lankroflex™ L (epoxidized linseed oil) available by VAL-TRIS Specialty Chemicals, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN.

Exemplary non-blocked polyisocyanates include but are not limited to VESTANAT® T 1890/100 which is a cycloaliphatic polyisocyanate based on isophorone diisocyanate and it is available by EVONIK Industries.

Exemplary blocked polyisocyanate adducts include but are not limited to VESTAGON®B 1530 which is an ε-caprolactam blocked polyisocyanate available by EVONIK Industries. ε-Caprolactam blocked polyisocyanates are particularly preferred.

Exemplary β-hydroxyalkyl-amides include but are not limited to Primid® XL-552 [N,N,N',N'-tetrakis-(2-hydroxyethyl)-adipamide], Primid® QM 1260 [N,N,N',N'-tetrakis (2-hydroxypropyl) hexanediamide], and Primid®SF-4510 available from EMS Chemie AG, bis[N,N-di(β-hydroxyethyl)] adipamide, bis[N,N-di(β-hydroxypropyl)] succinamide, bis[N,N-di(R-hydroxyethyl)] azelamide, bis[N,N-di (β-hydroxypropyl)] adipamide, and bis[N-methyl-N-(β-hydroxyethyl)] oxamide, and β-hydroxyalkyl-amides disclosed in WO 2019/170854 A1, and U.S. Pat. No. 4,076, 917 A. Further examples of β-hydroxylalkyl-amides are disclosed in U.S. Pat. Nos. 4,727,111, 4,788,255, 4,076,917, EP 322834 and EP 473380, WO 2009/106454 A1.

Preferably, the thermal radical initiators suitable to prepare the inventive microparticles, are selected from the group consisting of organic peroxides and azo polymerization initiators and mixtures thereof; more preferably the thermal radical initiators are organic peroxides. Preferably, the thermal radical initiators are solids. If liquid thermal radical initiators are used, however, preferably they are absorbed on solid carriers, such as fumed silica.

Exemplary organic peroxides include but are not limited to 2-4-diclorobenzyl peroxide, diisononanoyl peroxide, decanoyl peroxide, lauroyl peroxide, succinic acid peroxide, acetyl peroxide, benzoyl peroxide, diisobutyryl peroxide, acetyl cyclohexylsulfonyl peroxide, di(n-propyl)peroxy dicarbonate, di(sec-butyl)peroxy dicarbonate, di(2-ethylhexyl)peroxy dicarbonate, diisopropylperoxy alpha-cumylperoxy neodecanoate, alpha-cumylperoxy pivalate, t-amyl neodecanoate, t-amylperoxy neodecanoate, t-butylperoxy neodecanoate, t-amylperoxy pivalate, t-butylperoxy pivalate, 2,5-dimethyl-2,5-di(2-ethylhexanoylperoxy)hexane, t-amylperoxy-2-ethyl hexanoate, t-butylperoxy-2-ethyl hexanoate, and t-butylperoxy isobutyrate, t-butyl-peroxymaleic acid, 1,1-di(t-butylperoxy)-3,3,5-trimethylcyclohexane, o,o'-t-butyl-o-isopropyl monoperoxy carbonate, 2,5-dimethyl-2,5-di(benzoylperoxy) carbonate, o,o'-t-butyl-o-(2-ethylhexyl)-monoperoxy carbonate, t-butylperoxy acetate, t-butylperoxy benzoate, di-t-butyldiperoxy azelate, di-t-butyldiperoxy phthalate, dicumyl peroxide, 2,5-dimethyl-2,5-di(t-butylperoxy)hexane, t-butyl cumyl peroxide, di-t-butyl peroxide, and 2,5-dimethyl,2,5-di(t-butylperoxy) hexyne-3,2,5-dihydroperoxy-2,5-dimethyl hexane, cumene hydroperoxide, t-butyl hydroperoxide, t-amyl hydroperoxide, n-butyl-4,4-bis-(t-butylperoxy)valerate, 1,1-di(t-butylperoxy)-3,3,5-trimethyl cyclohexane, 1,1'-di-t-amyl-peroxy cyclohexane, 2,2-di(t-butylperoxy) butane, ethyl-3,3-di(t-butylperoxy)butyrate, blend of t-butyl peroctoate with 1,1-di(t-butylperoxy)cyclohexane, o,o'-t-butyl-o-isopropylmonoperoxy carbonate, the Trigonox® and Perkadox® types available by AKZO Nobel, such as the Trigonox® C-50PD (solid mixture of t-butyl peroxybenzoate and silicium oxide wherein the amount of t-butyl peroxybenzoate is 50% w/w on the solid mixture), Trigonox® 101-50D-PD (solid mixture of 2,5-dimethyl-2,5-di(tert-butylperoxy)hexyne and silicium oxide wherein the amount of 2,5-dimethyl-2,5-di (tert-butylperoxy)hexyne is 50% w/w on the solid mixture), Perkadox® BC-40B-PD/GR (dicumyl peroxide and calcium carbonate wherein the amount of dicumyl peroxide is 40% w/w on the solid mixture), Trigonox® 29-40B-PD/GR [1,1-di(tert-butylperoxy)-3,3,5-trimethylcyclohexane and calcium carbonate where in the amount of 1,1-di(tert-butylperoxy)-3,3,5-trimethylcyclohexane is 40% w/w on the solid mixture].

Exemplary azo polymerization initiators include but are not limited to 2,2'-azobis-(2,4-dimethylvaleronitrile), azobisisobutyronitrile, 2,2'-azobis-(2-methylbutyronitrile), 1,1'-azobis-(1-cyclohexanecarbonitrile), those available by WAKO such as for example azo nitriles (e.g. V-70, V-65, V-65HP, AIBN, AIBN—HP, V-59, V-40, V501), azo esters (e.g. V-601, V-601HP), azo imides (e.g. VAm-110, VA-086), azo imidazoles (e.g. VA-044,VA-061), azo imidines (e.g. VA-057, V-50), macro azo initiators (e.g. VPS-1001, VPS-1001N, VPE-0201).

Preferably, the agents suitable to prepare the inventive microparticles comprising a thermosetting polymeric network matrix which thermosetting polymeric network matrix comprises building groups selected from the group consisting of a crosslinker—as this is defined in the specification—and a thermal radical initiator—as this is defined in the specification, wherein the crosslinker is selected from the group consisting of polyepoxides, non-blocked polyisocyanates—preferably non-blocked isocyanates having an average of 1.5 to 3.5 isocyanate groups per molecule, more preferably a trimer of a non-blocked aliphatic diisocyanate-, blocked polyisocyanates—preferably blocked isocyanates having an average of 1.5 to 3.5 isocyanate groups per molecule, more preferably a trimer of a blocked aliphatic diisocyanate, even more preferably ε-Caprolactam blocked polyisocyanates—, β-hydroxyalkyl-amides, and mixtures thereof, and wherein the thermal radical initiator is selected from the group consisting of organic peroxides and azo polymerization initiators and mixtures thereof; more preferably the thermal radical initiators are organic peroxides. Preferably, the following combinations of resins with agents ('Combinations I-XIV' see below) are to be used in any one of the Processes A1 to A13 to prepare the inventive microparticles:

Combination I: a resin selected from the group consisting of carboxylic acid functional saturated polyester resins, carboxylic acid functional saturated acrylic resins, unsaturated polyester resins, and mixtures thereof, with an agent (crosslinker) selected from the group consisting of polyepoxides, β-hydroxyalkyl-amides, and mixtures thereof. The use of the resins and agents of Combination I in any one of the processes A1-A13, produces a thermosetting polymeric network matrix which thermosetting polymeric network matrix comprises building groups selected from the group consisting of ester groups, ether groups, amide groups, and combinations thereof and the thermosetting polymeric network matrix further comprises functional groups from the group consisting of hydroxyl groups, carboxyl groups, epoxy groups, and any combination thereof.

Combination II: a resin selected from the group consisting of hydroxyl functional saturated polyester resins, hydroxyl functional saturated acrylic resins, unsaturated polyester resins, and mixtures thereof, with an agent (crosslinker) selected from the group consisting of non-blocked polyisocyanates—preferably non-blocked isocyanates having an average of 1.5 to 3.5 isocyanate groups per molecule, more preferably a trimer of a non-blocked aliphatic diisocyanate-, blocked polyisocyanates—preferably blocked isocyanates having an average of 1.5 to 3.5 isocyanate groups per molecule, more preferably a trimer of a blocked aliphatic diisocyanate, even more preferably ε-Caprolactam blocked polyisocyanates. The use of the resins and agents of Combination II in any one of the processes A1-A13, produces a thermosetting polymeric network matrix which thermosetting polymeric network matrix comprises building groups selected from the group consisting of ester groups, urethane groups, and combinations thereof and the thermosetting polymeric network matrix further comprises functional groups from the group consisting of hydroxyl groups, carboxyl groups, isocyanate groups, and any combination thereof.

Combination III: a resin selected from the group consisting of unsaturated polyester resins, unsaturated polyester acrylate resins, vinyl functionalized urethane resins (preferably vinyl ether functionalized urethane resins), and mixtures thereof, with an agent (thermal radical initiator) selected from the group consisting of organic peroxides and azo polymerization initiators and mixtures thereof; more preferably the thermal radical initiators are organic peroxides. The use of the resins and agents of Combination III in any one of the processes A1-A13, produces a thermosetting polymeric network matrix which thermosetting polymeric network matrix comprises building groups selected from the group consisting of ester groups, ether groups, urethane groups, and combinations thereof and the thermosetting polymeric network matrix further comprises functional groups from the group consisting of hydroxyl groups, carboxyl groups, ethylenic groups, and any combination thereof.

Combination IV: a resin selected from the group consisting of carboxylic acid functional poly(ester-amide)resins, hydroxylic functional poly(ester-amide) resins, carboxylic acid functional saturated amide resins, amino functional saturated amide resins and mixtures thereof, with an agent (crosslinker) selected from the group consisting of polyepoxides, β-hydroxyalkyl-amides, polyisocyanates and mixtures thereof. The use of the resins and agents of Combination IV in any one of the processes A1-A13, produces a thermosetting polymeric matrix which thermosetting polymeric matrix comprises building groups selected from the group consisting of ester groups, ether groups, amide groups, urethane groups, and combinations thereof, preferably selected from the group consisting of ester groups, ether groups, amide groups, and combinations thereof, and the thermosetting polymeric matrix further comprises functional groups from the group consisting of hydroxyl groups, carboxyl groups, amino groups, isocyanate groups, epoxy groups, and any combination thereof, preferably selected from the group consisting of hydroxyl groups, carboxyl groups, epoxy groups, ethylenic groups, and any combination thereof.

Combination V:
i) a resin selected from the group consisting of carboxylic acid functional saturated polyester resins (including but not limited to Uralac® P 831, Uralac® P 4810, Uralac® P 3485, Uralac® P 5070, Uralac® P 3211, Uralac® P 865, Uralac® P 877, Uralac® P 3250 all available by DSM, and the polyester resin PR-2 shown in the Examples), with
ii) an agent (crosslinker) selected from the group consisting of β-hydroxyalkyl-amides [including but not limited to Primid® XL-552 [N,N,N',N'-tetrakis-(2-hydroxyethyl)-adipamide], Primid® QM 1260 [N,N,N',N'-tetrakis(2-hydroxypropyl) hexanediamide], and Primid®SF-4510 available from EMS Chemie AG, and β-hydroxyalkyl-amides disclosed in U.S. Pat. No. 4,076,917 A, WO 2019/170854 A1, U.S. Pat. Nos. 4,727,111, 4,788,255, 4,076,917, EP 322834, EP 473380 and WO 2009/106454 A1], polyepoxides [including but are not limited to ISOCRYL®EP-570G (which is a glycidyl-functional acrylic hardener) available by Estron Chemical, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN and Lankroflex™ L (epoxidised linseed oil) available by VALTRIS], and mixtures thereof.

The use of the resins and agents of Combination V in any one of the processes A1-A13, produces a thermosetting polymeric matrix which thermosetting polymeric matrix comprises building groups selected from the group consisting of ester groups, ether groups, amide groups and combinations thereof and the thermosetting polymeric matrix further comprises functional groups from the group consisting of hydroxyl groups, carboxyl groups, epoxy groups and any combination thereof.

Combination VI:
i) a resin selected from the group consisting of carboxylic acid functional saturated polyester resins (including but are not limited to Uralac® P 831, Uralac® P 4810, Uralac® P 3485, Uralac® P 5070, Uralac® P 3211, Uralac® P 865, Uralac® P 877, Uralac® P 3250 all available by DSM, and the polyester resin PR-2 shown in the Examples), carboxylic acid functional saturated acrylic resins (including but are not limited to NeoCryl® B-817, NeoCryl® B-818, NeoCryl® B-890 all available by DSM), and mixtures thereof, with
ii) an agent (crosslinker) selected from the group consisting of β-hydroxyalkyl-amides [including but are not limited to Primid® XL-552 [N,N,N',N'-tetrakis-(2-hydroxyethyl)-adipamide], Primid® QM 1260 [N,N,N',N'-tetrakis(2-hydroxypropyl) hexanediamide], and Primid®SF-4510 available from EMS Chemie AG, and β-hydroxyalkyl-amides disclosed in U.S. Pat. No. 4,076,917 A, WO 2019/170854 A1, U.S. Pat. Nos. 4,727,111, 4,788,255, 4,076,917, EP 322834, EP 473380 and WO 2009/106454 A1].

The use of the resins and agents of Combination VI in any one of the processes A1-A13, produces a thermosetting polymeric network matrix which thermosetting polymeric network matrix comprises building groups selected from the group consisting of ester groups, amide groups, and combinations thereof and the thermosetting polymeric network matrix further comprises functional groups from the group consisting of hydroxyl groups, carboxyl groups, and any combination thereof.

Combination VII:
i) a resin selected from the group consisting of carboxylic acid functional saturated acrylic resins (including but are not limited to NeoCryl® B-817, NeoCryl® B-818, NeoCryl® B-890), with ii) an agent (crosslinker) selected from the group consisting of β-hydroxyalkyl-amides [including but not limited to Primid® XL-552 [N,N,N',N'-tetrakis-(2-hydroxyethyl)-adipamide], Primid® QM 1260 [N,N,N',N'-tetrakis(2-hydroxpropyl) hexanediamide], and Primid®SF-4510 available from EMS Chemie AG, and β-hydroxyalkyl-amides disclosed in U.S. Pat. No. 4,076,917 A, WO 2019/170854 A1, U.S. Pat. Nos. 4,727,111, 4,788,255, 4,076,917, EP 322834, EP 473380 and WO 2009/106454 A1], polyepoxides [including but are not limited to ISOCRYL®EP-570G (which is a glycidyl-functional acrylic hardener) available by Estron Chemical, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN and Lankroflex™ L (epoxidised linseed oil) available by VALTRIS], and mixtures thereof.

The use of the resins and agents of Combination VII in any one of the processes A1-A13, produces a thermosetting polymeric network matrix which thermosetting polymeric network matrix comprises building groups selected from the group consisting of ester groups, ether groups, amide groups, and combinations thereof and the thermosetting polymeric network matrix further comprises functional groups from the group consisting of hydroxyl groups, carboxyl groups, epoxy groups, and any combination thereof.

Combination VIII:
  i) a resin selected from the group consisting of carboxylic acid functional saturated polyester resins (including but are not limited to Uralac® P 831, Uralac® P 4810, Uralac® P 3485, Uralac® P 5070, Uralac® P 3211, Uralac® P 865, Uralac® P 877, Uralac® P 3250 all available by DSM, and the polyester resin PR-2 shown in the Examples), carboxylic acid functional saturated acrylic resins (including but are not limited to NeoCryl® B-817, NeoCryl® B-818, NeoCryl® B-890 all available by DSM), and mixtures thereof, with
  ii) an agent (crosslinker) selected from the group consisting of polyepoxides [including but not limited to ISOCRYL®EP-570G (which is a glycidyl-functional acrylic hardener) available by Estron Chemical, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN and Lankroflex™ L (epoxidised linseed oil) available by VALTRIS].

The use of the resins and agents of Combination VIII in any one of the processes A1-A13, produces a thermosetting polymeric matrix which thermosetting polymeric matrix comprises building groups selected from the group consisting of ester groups, ether groups, and combinations thereof and the thermosetting polymeric matrix further comprises functional groups from the group consisting of hydroxyl groups, carboxyl groups, epoxy groups and any combination thereof.

Combination IX:
  i) a resin selected from the group consisting of hydroxyl functional saturated polyester resins (including but not limited to Uralac® P 1413, Uralac® P 1420, Uralac® P 1475, Uralac® P 1550, Uralac® P 1580, all available by DSM), hydroxyl functional saturated acrylic resins (including but are not limited to NeoCryl® B-819, NeoCryl® B-851, NeoCryl® B-859, all available by DSM), and mixtures thereof, with
  ii) an agent (crosslinker) selected from the group consisting of a cycloaliphatic polyisocyanates based on isophorone diisocyanate (including but not limited to VESTANAT® T 1890/100).

The use of the resins and agents of Combination IX in any one of the processes A1-A13, produces a thermosetting polymeric network matrix which thermosetting polymeric network matrix comprises building groups selected from the group consisting of ester groups, urethane groups, and combinations thereof and the thermosetting polymeric network matrix further comprises functional groups from the group consisting of hydroxyl groups, carboxyl groups, isocyanate groups, and any combination thereof.

Combination X:
  i) a resin selected from the group consisting of unsaturated polyester resins [including but limited to Uracross® P 755, Uracross® P 754, Uracross® P 752, Uracross® P 3126, Uralac® P1011 R, Uralac® P1021 R, Uralac® P1031 R, Uralac® P1081 R, as well as PALATAL® P6, PALATAL® P69, ATLAC® 5200, ATLAC® PREMIUM 600, BEYONE™ 410-N-01 and BEYONE™ 806-H-01, and the polyester resin PR-1 shown in the Examples], vinyl functionalized urethane resins (preferably vinyl ether functionalized urethane resins including but not limited to Uracross® P 3307, Uralac® P1900 C, Uralac® P1910 C, and Uralac® P1920 C), and mixtures thereof, with
  ii) an agent (thermal radical initiator) selected from the group consisting of organic peroxides (including but not limited to Trigonox® C-50PD).

The use of the resins and agents of Combination X in any one of the processes A1-A13, produces a thermosetting polymeric network matrix which thermosetting polymeric network matrix comprises building groups selected from the group consisting of ester groups, ether groups, urethane groups, and combinations thereof and the thermosetting polymeric network matrix further comprises functional groups from the group consisting of hydroxyl groups, carboxyl groups, ethylenic groups, and any combination thereof.

Combination XI:
  i) a resin selected from the group consisting of unsaturated polyester resins [including but not limited to Uracross® P 755, Uracross® P 754, Uracross® P 752, Uracross® P 3126, Uralac® P1011 R, Uralac® P1021 R, Uralac® P1031 R, Uralac® P1081 R, as well as PALATAL® P6, PALATAL® P69, ATLAC® 5200, ATLAC® PREMIUM 600, BEYONE™ 410-N-01 and BEYONE™ 806-H-01, and the polyester resin PR-1 shown in the Examples], with
  ii) an agent selected from the group consisting of organic peroxides (including but not limited to Trigonox® C-50PD), cycloaliphatic polyisocyanates based on isophorone diisocyanate (including but not limited to VESTANAT® T 1890/100), and mixtures thereof.

The use of the resins and agents of Combination V in any one of the processes A1-A13, produces a thermosetting polymeric network matrix which thermosetting polymeric network matrix comprises building groups selected from the group consisting of ester groups, urethane groups, and combinations thereof and the thermosetting polymeric network matrix further comprises functional groups from the group consisting of hydroxyl groups, carboxyl groups, isocyanate groups, ethylenic groups, and any combination thereof.

Combination XII:
  i) a resin selected from the group consisting of unsaturated polyester resins [including but not limited to Uracross® P 755, Uracross® P 754, Uracross® P 752, Uracross® P 3126, Uralac® P1011 R, Uralac® P1021 R, Uralac® P1031 R, Uralac® P1081 R, as well as PALATAL® P6, PALATAL® P69, ATLAC® 5200, ATLAC® PREMIUM 600, BEYONE™ 410-N-01 and BEYONE™ 806-H-01, and the polyester resin PR-1 shown in the Examples], with
  ii) an agent selected from the group consisting of organic peroxides (including but not limited to Trigonox® C-50PD), polyepoxides [including but not limited to ISOCRYL®EP-570G (which is a glycidyl-functional acrylic hardener) available by Estron Chemical, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN and Lankroflex™ L (Epoxidised linseed oil) available by VALTRIS], and mixtures thereof.

The use of the resins and agents of Combination XII in any one of the processes A1-A13, produces a thermosetting polymeric network matrix which thermosetting polymeric network matrix comprises building groups selected from the group consisting of ester groups, ether groups, and combinations thereof and the thermosetting polymeric network matrix further comprises functional groups from the group consisting of hydroxyl groups, carboxyl groups, epoxy groups, ethylenic groups, and any combination thereof.

Combination XIII:
  i) a resin selected from the group consisting of hydroxyl functional saturated poly(ester-amide) resins [including but not limited to Hybrane® P 1000, Hybrane® H 1550, Hybrane® H 1500 and Hybrane® S 1200) and poly(ester-amide) resins described in US 2002/0055609 A1], carboxylic acid functional saturated polyester resins (including but are not limited to Uralac® P 831, Uralac® P 4810, Uralac® P 3485, Uralac® P 5070, Uralac® P 3211, Uralac® P 865, Uralac® P 877, Uralac® P 3250 all available by DSM, and the polyester resin PR-2 shown in the Examples), and mixtures thereof, with
  ii) an agent (crosslinker) selected from the group consisting of a cycloaliphatic polyisocyanates based on isophorone diisocyanate (including but not limited to VESTANAT® T 1890/100).

The use of the resins and agents of Combination XIII in any one of the processes A1-A13, produces a thermosetting polymeric matrix which thermosetting polymeric matrix comprises building groups selected from the group consisting of ester groups, amide groups, urethane groups, and combinations thereof, preferably selected from the group consisting of ester groups, ether groups, amide groups, and combinations thereof, and the thermosetting polymeric matrix further comprises functional groups from the group consisting of hydroxyl groups, carboxyl groups, isocyanate groups, and any combination thereof.

Combination XIV:
  i) a resin selected from the group consisting of amino functional polyamide resins [including but not limited to UNI-REZ™2638 and UNI-REZ™2678available by Kraton,) and amino functional polyamide resins described in US 2008/0226827 A1], with
  ii) an agent (crosslinker) selected from the group consisting of polyepoxides [including but not limited to ISOCRYL®EP-570G (which is a glycidyl-functional acrylic hardener) available by Estron Chemical, Araldite® PT 810 (triglycidyl isocyanurate) Araldite® PT 910 (epoxy resin consisting of a mixture of glycidyl esters), Araldite® PT 912 and Araldite® GT 7004 (which is a bisphenol-A epoxy resin) available by HUNTSMAN and Lankroflex™ L (epoxidised linseed oil) available by VALTRIS].

The use of the resins and agents of Combination XVI in any one of the processes A1-A13, produces a thermosetting polymeric matrix which thermosetting polymeric matrix comprises building groups selected from the group consisting of ester groups, amide groups, and combinations thereof and the thermosetting polymeric matrix further comprises functional groups from the group consisting of carboxyl groups, amino groups, epoxy groups, and any combination thereof.

If the inventive microparticles are intended to be used:
  i) as matting agents in coating compositions, or
  ii) in compositions suitable for additive manufacturing e.g. 3D-printing or in 3D-printed articles, or
  iii) in materials having high water absorptivity (known in the art as 'super-absorbents'), then preferably the reactive melt-extrusion (see step 2 of any one of the processes A1-A13 disclosed in this section and any process disclosed in the entire specification) takes place at any temperature or (preferably) range of temperatures of from and including 120 up to and including 200° C. and wherein the average residence time is from and including 10 seconds up to and including 7 minutes, preferably the average residence time is from and including 20 seconds up to and including 7 minutes, more preferably the average residence time is from and including 30 seconds up to and including 5 minutes; more preferably the reactive melt-extrusion (see step 2 of any one of the processes A1-A13 disclosed in this section and any process disclosed in the entire specification) takes place at any temperature or (preferably) range of temperatures of from and including 140 up to and including 200° C. and wherein the average residence time is from and including 10 seconds up to and including 7 minutes, preferably the average residence time is from and including 20 seconds up to and including 7 minutes, more preferably the average residence time is from and including 30 seconds up to and including 5 minutes; most preferably the reactive melt-extrusion (see step 2 of any one of the processes A1-A13 disclosed in this section and any process disclosed in the entire specification) takes place at any temperature or (preferably) range of temperatures of from and including 160 up to and including 200° C. and wherein the average residence time is from and including 10 seconds up to and including 7 minutes, preferably the average residence time is from and including 20 seconds up to and including 7 minutes, more preferably the average residence time is from and including 30 seconds up to and including 5 minutes; especially, the reactive melt-extrusion (see step 2 of any one of the processes A1-A13 disclosed in this section and any process disclosed in the entire specification) takes place at any temperature or (preferably) range of temperatures of from and including 180 up to and including 200° C. and wherein the average residence time is from and including 10 seconds up to and including 7 minutes, preferably the average residence time is from and including 20 seconds up to and including 7 minutes, more preferably the average residence time is from and including 30 seconds up to and including 5 minutes.

The average residence time is calculated as indicated below; the equation applicable depends on the type of extruder (single- or twin-screw) and in case of a twin-screw extruder on the way the screws are rotating in relation to each other (co- or counter-rotating). The average residence time for co-rotating twin-screw extruders is calculated according to the following equation B1:

$$\text{Average residence time} = (A/Q_v) + (B/N) \quad \text{(equation B1)}$$

wherein
- A=the total filled volume (in $cm^3$) of all the functional zones of the extruder, and
- $Q_v$=the volumetric run rate (Kg/hour), and
- B=the number of leads in the conveying zones of the extruder, and
- N=the rotations per minute (rpm) of the twin-screw divided by 60.

The total filled volume (A) depends on the twin-screw design— the length and number of the functional zones and the cross-sectional area of the elements in the functional zone. All these parameters are known or become known once the melt-extruder is configured for the purpose of carrying out the reactive melt-extrusion step. Once the twin screw is built-up, the residence time can be adjusted by changing either the volumetric run rate or the rotation speed of the twin-screw.

The average residence time for single-screw extruders and counter-rotating twin-screw extruders is calculated according to the following equation B2:

$$\text{Average residence time} = (A/Q_v) \quad \text{(equation B2)}$$

wherein
- A=the total filled volume (in $cm^3$) of all the functional zones of the extruder, and
- $Q_v$=the volumetric run rate (Kg/hour).

For the purposes of this specification, the average residence time for co-rotating twin-screw extruders is to be calculated according to the equation B1 while the average residence time for single extruders and counter-rotating twin-screw extruders is to be calculated according to the equation B2.

For any one of the processes A1 to A13 and also those disclosed in the entire specification, co-rotating (and preferably intermeshing) twin-screw extruders are preferred over single screw extruders because they allow for a modular geometry thus offering configurations that are more adequate to the reaction to develop, they are starve fed i.e. the feed rate is controlled by volumetric or gravimetric feeder(s), the residence time and level of thermomechanical stresses are relatively easy to control, they have superior mixing capacities, the screws can rotate at high screw speeds thus promoting high dispersion levels whilst guaranteeing high throughputs. Typical examples of twin screw extruders for reactive extrusion are the ZSK Mc[18], and the ZSK My PLUS available by Coperion. For any one of the processes A1 to A13 and also those disclosed in the entire specification, co-rotating (and preferably intermeshing) twin-screw extruders are also preferred over counter-rotating twin-screw extruders.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

3. The Compositions of the Invention and Processes for Making These Compositions The inventive microparticles can be used for preparing various compositions. These compositions are referred in this specification as inventive compositions. The inventive compositions may be prepared by well-known methods such as dispersing the inventive microparticles into a medium which medium is optionally able to react with at least a functional group—if the latter is present—of the thermosetting polymeric network matrix, and which medium is selected from the group consisting of gases, liquids, solids and combinations thereof (preferably the medium is selected from the group consisting of liquids, solids and combinations thereof, more preferably the medium is a liquid), the physical state of the medium being assessed at 23° C. and at atmospheric pressure. The inventive microparticles may be dispersed into the medium via mixing (e.g. shear mixing, diffusive mixing, convective mixing), pneumatic conveying. The mixing can be carried out in for example tumbling mixers, convective mixers, fluidized bed mixers, high shear mixers, pneumatic standpipes.

More specifically, an inventive composition comprises:
i) microparticles as described in the claims and as disclosed in the specification, and
ii) a medium, optionally able to react with at least a functional group—if the latter is present—of the thermosetting polymeric network matrix, and which medium is selected from the group consisting of gases, liquids, solids and combinations thereof (preferably the medium is selected from the group consisting of liquids, solids and combinations thereof, more preferably the medium is a liquid), the physical state of the medium being assessed at 23° C. and at atmospheric pressure.

Preferably, the inventive composition comprises:
i) microparticles as described in the claims and as disclosed in the specification, and
ii) a medium, optionally able to react with at least a functional group—if the latter is present—of the thermosetting polymeric network matrix, and which medium is a solid at 23° C. and at atmospheric pressure.

Preferably, the inventive composition comprises:
i) microparticles as described in the claims and as disclosed in the specification, and
ii) a medium, optionally able to react with at least a functional group—if the latter is present—of the thermosetting polymeric network matrix, and which medium is a liquid at 23° C. and at atmospheric pressure.

Preferably, the inventive composition is a liquid coating composition that comprises:
i) microparticles as described in the claims and as disclosed in the specification, and
ii) a medium, optionally able to react with at least a functional group—if the latter is present—of the thermosetting polymeric network matrix, and which medium is a liquid at 23° C. and at atmospheric pressure.

Preferably, the inventive composition is an aqueous coating composition that comprises:
i) microparticles as described in the claims and as disclosed in the specification, and ii) a medium, wherein the medium comprises water, preferably the medium is water, at 23° C. and at atmospheric pressure.

Preferably, the inventive composition comprises:
i) microparticles as described in the claims and as disclosed in the specification, and
ii) a medium, optionally able to react with at least a functional group—if the latter is present—of the thermosetting polymeric network matrix, and which medium is a gas at 23° C. and at atmospheric pressure.

In yet another embodiment, the invention provides for cured compositions obtained by curing an inventive composition as disclosed in the specification. The curing of the compositions of the invention may take place either by physical drying or chemical reaction (resulting to the formation of irreversible covalent chemical bonds) or a combination of physical drying and chemical reaction. The curing of the compositions of the invention may take place either at standard conditions (as these are defined in the specification), or by using heat, or by using pressure, or by applying vacuum, or by any combination thereof.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

4. An Object or a Kit-Of-Parts

In yet another aspect, the invention provides for an object or a kit-of-parts comprising:
i) microparticles as disclosed in the specification, and/or
ii) a composition as disclosed in the specification, and/or
iii) a cured composition as disclosed in the specification.

Preferably, the object or kit-of-parts is selected from the group consisting of a film, a 3D-printed object, a container, a textile, a towel, a pad, a bag, and combinations thereof.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

5. Other Aspects and Embodiments of the Invention

In yet another aspect, the invention provides for a process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, storage energy devices, wherein the method comprises the step of providing microparticles as disclosed in the specification, and/or compositions as disclosed in the specification, and/or cured compositions as disclosed in the specification, and/or objects as disclosed in the specification, and/or a kit-of-parts as disclosed in the specification.

In yet another aspect, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
in paints, coatings, films, adhesives, waxes, matting agents, absorbents, 3D-printing, automotive applications, marine applications, aerospace applications, medical applications, defense applications, sports/recreational applications, architectural applications, bottling applications, household applications, machinery applications, can applications, coil applications, textile applications, electrical applications, and energy applications.

In yet another aspect, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
in paints, coatings, films, adhesives, waxes, matting agents, absorbents, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

In yet another aspect, the invention provides for a use of:
i) microparticles as disclosed in the specification, and/or
ii) compositions as disclosed in the specification, and/or iii) cured compositions as disclosed in the specification, and/or
iv) objects as disclosed in the specification, and/or
v) a kit-of-parts as disclosed in the specification,
for lowering the gloss of coatings.

In yet another embodiment, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
for making matte coatings.

In yet another aspect, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
for making soft-touch coatings.

In yet another aspect, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
for making 3D-printed objects.

In yet another aspect, the invention provides for a use of:
i) microparticles as disclosed in the specification, and/or
ii) compositions as disclosed in the specification, and/or
iii) cured compositions as disclosed in the specification, and/or
iv) objects as disclosed in the specification, and/or
v) a kit-of-parts as disclosed in the specification,
for making absorbent and superabsorbent objects.

Yet, another aspects of the invention are the inventive microparticles InvMP1, InvMP2, InvMP3, InvMP4 and InvMP5 shown in the Examples.

Yet, another aspects of the invention are the inventive compositions InvMP1-C1, InvMP2-C2, InvMP3-C3, InvMP4-C4 and InvMP5-05 shown in the Examples.

Yet, another aspects of the invention are the inventive (cured) coatings InvMP1-CT1, InvMP2-CT2, InvMP3-CT3, InvMP4-CT4, InvMP5-CT5 shown in the Examples.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire specification.

Many other variations and embodiments of the invention will be apparent to those skilled in the art and such variations are contemplated within the scope of the claims.

Any feature, element, component, embodiment, range and especially any preferred feature, preferred element, preferred embodiment, preferred range, preferred combination of ranges, preferment described in the entire specification can be combined with each other.

Further aspects of the invention and preferred features thereof are given in the claims in the specification.

The invention will now be described in detail with reference to the following non limiting examples which are by way of illustration only.

6. Examples

The invention is explained in more detail with reference to the following non-limiting examples.

In the Examples section:
the abbreviation 'InvMP' (followed by an indexing number) represents microparticles according to the invention;
the abbreviation 'CompMP' (followed by an indexing number) represents microparticles not according to the invention;
the abbreviation '-C' (followed by an indexing number) and used after and next to the InvPM (including InvMP's indexing number) represents compositions according to the invention;
the abbreviation '-C' (followed by an indexing number) and used after and next to the CompMP (including CompMP's indexing number) represents compositions not according to the invention.
the abbreviation '-CT' (followed by an indexing number) and used after and next to the InvMP (including InvMP's indexing number) represents coatings according to the invention;
the abbreviation '-CT' (followed by an indexing number) and used after and next to the CompMP (including CompMP's indexing number) represents coatings not according to the invention.

By 'inventive examples' is meant in the specification examples which are according to the invention.

By 'comparative examples' is meant in the specification examples which are not according to the invention.

All the Examples shown in this section were carried out in in a controlled laboratory environment at standard conditions (as these are defined in the specification), relative humidity of 50±1% and an airflow of 0.1 m/s.

6.1 Chemicals, Raw Materials and Other Materials Used in the Examples Shown in Tables 1 and 2

Ethylene glycol (purity 97.5%) was supplied by Brenntag. 2,2-dimethylpropane-1,3-diol (neopentyl glycol; purity 99-100%) was supplied by BASF. Adipic acid (purity 99.8%) was supplied by BASF. Isophthalic acid (purity 95-100%) was supplied by Lotte Chemical. Terephthalic acid (purity 99%) was supplied by BP. Trimellitic anhydride (purity 97.5%) and fumaric acid (99.7% purity) were supplied by Polynt. Hydrogenated bisphenol-A (purity>97.0%) was supplied by ECEM. Cardura™ $E_{10}P$ glycidyl ester monomer (see Scheme 3 below) is the glycidyl ester of Versatic™ Acid 10 a synthetic saturated monocarboxylic acid of highly branched $C_{10}$ isomers; Its structure is represented by Scheme 3. The molecular formula of the main product (2,3-epoxy propyl neodecanoate) is: $C_{13}H_{24}O_3$); purity >99.8%; epoxy group content: 4100-4250 mmol/Kg; boiling range 5%-90% (v/v) at 101.3 kPa (ASTM D86): 251-278° C.; viscosity at 25° C. (ASTM D445): 7.1 mPa·s; density at t (when 15° C.=t=40° C.; ASTM D4052]: 0.976-0.00065t; flash point (PMCC) (ASTM D93): 126° C.; solubility of Cardura $E_{10}P$ at 20° C.: 0.7% m/m; low viscosity and low odour; water content (ASTM D4672): max 0.1% m/m; was supplied by Hexion.

Scheme 3: Cardura™ E10P glycidyl ester monomer; each of the $R_1$ and $R_2$ is a hydrocarbyl and the aggregate number of the carbon atoms in $R_1$ and $R_2$ is 7; $R_1 + R_2 = 7$ carbon atoms.

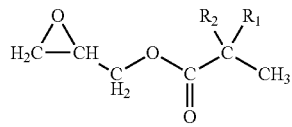

Dimethylol propionic acid (DMPA, purity >95%) was supplied by GEO chemicals. Mono t-butyl hydroquinone (MTBHQ; (purity 98%) used as inhibitor was supplied by Eastman. Butyl stannoic acid (purity 98%) was used as the polycondensation catalyst and it was supplied by PMC Group. Cetyltrimethylammonium bromide (also known as hexadecyltrimethylammonium bromide; CAS No: 57-09-0; purity ≥98%) was supplied by Sigma-Aldrich. Tin octoate (purity>96%) was used as a was used as the polycondensation catalyst was supplied by Evonik. Distearyl pentaerythritol diphosphate (purity 90-100%) was used as an antioxidant and it was supplied by Addivant. Priplast™ CP 3192 is a dimer fatty acid-based polyester polyol (waxy solid) with a $M_n$ of 2000 Da, hydroxyl value of 52-60 mg KOH/g, melting point 45° C., colour <2 Gardner, typical viscosity at 80° C.: 143 mPa.$) was supplied by Croda. Methyl methacrylate (MMA, purity >99.8%), and n-butyl methacrylate (BA, purity 99.5%) were supplied by Arkema. Isophorone diisocyanate (IPDI, purity 99.5%) was supplied by Covestro. 6,6'-di-tert-butyl-4,4'-butylidenedi-m-cresol (purity >99%) used as an antioxidant was supplied by Adeka. Triethylamine (TEA, purity 99.7%) was used as a neutralizing agent and was supplied by BASF. Iron EDTA [sodium iron ($Fe^{+3}$) ethylenediaminetetraacetic acid (EDTA)] (abbreviated as FeEDTA) was used as reducing agent was supplied by Sigma-Aldrich. Hydrazine (15% w/w aqueous solution), was supplied by Lanxess. Dowanol™ DPnB (dipropylene glycol n-butyl ether; $C_4H_9O[CH_2CH(CH_3)O]_2H$ (major isomer); purity >98.5%; molecular weight 190.3, boiling point at 760 mmHg: 230° C.; flash point (setaflash closed cup): 100.4° C.; freezing point <−75° C.; specific gravity (25/25° C.): 0.910; density at 25° C.: 0.907 g/$cm^3$; density at 20° C.: 0.911 g/$cm^3$; viscosity at 25° C.: 4.9 cP; CAS Number: 29911-28-2; EINECS 249-951-5) was used as coalescent agent and it was supplied by DOW. Tertiary butyl-hydroperoxide (t-BHPO, 70% w/w in water solution) free-radical-yielding initiator, was supplied by Akzo Nobel. Trigonox® C-50D a solid mixture of t-butyl peroxybenzoate and silicium oxide wherein the amount of t-butyl peroxybenzoate is 50% w/w on the solid mixture was supplied by AkzoNobel Polymer Chemicals. Primid® XL-552 [N,N,N',N'-tetrakis-(2-hydroxyethyl)-adipamide] was supplied by EMS Chemie AG. Araldite® GT 7004 (which is a solid bisphenol-A epoxy resin of medium molecular weight; epoxy index (ISO 3001): 1.33-1.40 eq/Kg; epoxy equivalent (ISO 3001): 714-752 g/eq; hydroxyl value (ISO/DIS 4629): 2.8 eq/Kg; softening point (Mettler, DIN 51920): 95-101 oC; melt viscosity at 175° C. (ISO 3219): 750-950 mPa·s; density at 25° C. (ISO 8130-3): 1.19 g/$cm^3$; flash point (ISO 2592): 200° C.) available by HUNTSMAN.

Figure 2:
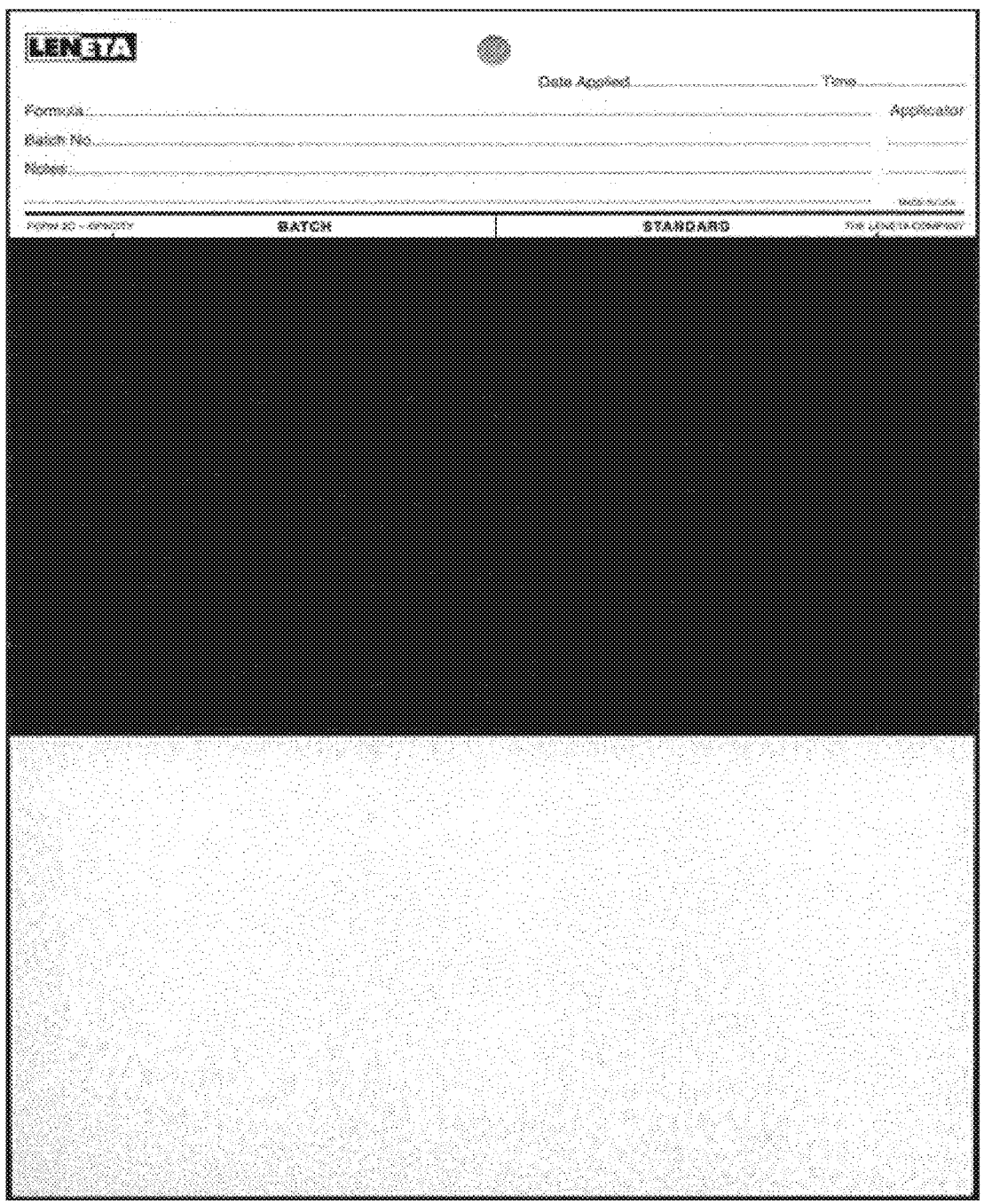
FIG. 2 shows a top-down picture of a Leneta chart 2C [the Leneta chart 2C (overall dimensions of 7-5/8 ×10-1/4 in; 194 ×260 mm) is a black and white sealed opacity chart which is half black and half white].
Figure 3:
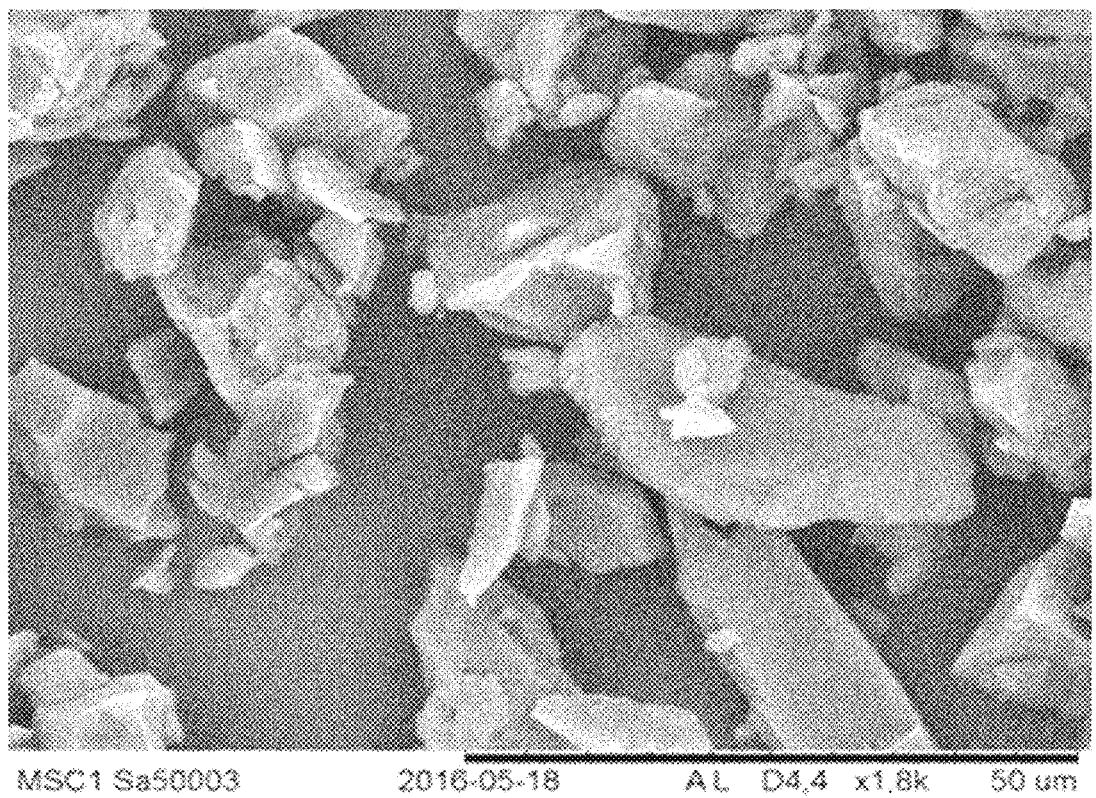
FIG. 3 shows a scanning electron microscopy picture of the microparticles InvMP2 at 1800×magnification.

The Leneta chart 2C was used as substrate for the clear coatings prepared and evaluated in the Examples. The Leneta chart 2C [overall dimensions of 7⅝×10¼ in; 194× 260 mm] is a black and white sealed opacity chart which is half black and half white. For brevity the Leneta chart 2C substrates used in the Examples are mentioned in the specification as 'Leneta 2C'. FIG. 2 is a picture of a Leneta 2C.

6.2 Determination of the $M_n$ and $M_w$—GPC (Gel Permeation Chromatography)

The number average molecular weight ($M_n$) and the weight average molecular weight ($M_w$) were determined via Gel Permeation Chromatography (GPC) calibrated with a set of polystyrene standards with a molecular weight range of from 500 up to 16×$10^6$ Da, and using as eluent stabilized tetrahydrofuran (THF) modified with 0.8 (v/v %) acetic acid, at a flow rate of 1 mL/min at 40° C. 50 mg of a resin dissolved in a suitable organic solvent e.g. THF were diluted with 5 ml of eluent, and used for the measurement. The GPC measurements were carried out on a Waters Alliance system equipped with: i) a Waters Alliance 2414 refractive index detector at 40° C., and ii) a Waters Alliance 2695 separation module equipped with two consecutive PL-gel columns of Mixed-C type with l/d=300/7.5 mm and filled with particles having a particle size of 5 micron (supplied by Agilent). The data processing and analysis was performed via Empower 3 Chromatography Data Software provided by Waters.

The polydispersity (D) was calculated according to the following equation: $D=M_w/M_n$.

6.3 Determination of the $T_m$ of Microparticles—DSC (Differential Scanning Calorimetry)

The melting temperature ($T_m$ in ° C.) was measured via Differential Scanning calorimetry (DSC) on a TA instruments DSC Q2000 apparatus equipped with a cooling system TA instruments RCS90, in N2 atmosphere calibrated with indium. The processing of the signal (DSC thermogram, Heat Flow vs. Temperature) was carried out using Universal Analysis 2000 software version 4.5a provided by TA instruments, as follows: a sample of 10±0.5 mg was weight and placed in the DSC cell. The sample was brought to 25° C. In the first heating curve, the sample was heated to 200° C. with a heating rate of 5° C./min. The sample was kept at 200° C. for 1 min. The sample was subsequently cooled down to −50° C. with a cooling rate of 5° C./min, resulting in a cooling curve. After reaching −50° C. the sample was immediately heated to 200° C. with a heating rate of 5° C./min, affording a second heating curve. The second heating curve was processed as the Y axis of the curve representing the heat flow has exotherm up and endotherm down and the X axis representing the temperature. The $T_m$ was measured as the temperature recorded at the minimum heat flow of the endothermic signal attributed to the melting of the sample. The assessment of whether or not there is a melting temperature ($T_m$) and melting enthalpy ($\Delta H_m$) is determined from the second heating curve (−50° C. to 200° C., heating rate of 5° C./min). If the sample has melting temperature ($T_m$), a minimum endothermic peak of the heat flow, attributed to the melting of the sample, should be present on the second heating curve, in the temperature interval (−50° C. to 200° C.).

6.4 the Characterization of the Architecture of Microparticles

The characterization of the architecture of a microparticle as: random, or core-shell, or multi-layered, or occluded, or partially engulfed, is carried out by Scanning Electron Microscopy (SEM) as described below.

A small amount of microparticles was grinded to an average particle size of 10±1 micron. The grinded microparticles were dispersed and immobilized onto the SEM holder with carbon or copper tape. Loose particles were removed from the holder by compressed air spray. The sample was then examined using Phenom ProX Desktop SEM (Phenom World/Thermo-Fisher Scientific). In SEM, back scattered electrons (BSE) were detected and used to reconstruct the image of the sample surface. A magnification of ×1800 was used. The microparticles were characterized as having:

i) a random architecture, or ii) a core-shell architecture, or a multi-layered architecture, or occluded architecture, or partially engulfed architecture, or a combination thereof, each of i) or ii) in view of their corresponding definitions provided in the specification (see the section 'Definitions').

6.5 Determination of the Building Groups and of the Functional Groups of the Thermosetting Polymeric Network Matrix—FTIR Spectroscopy The identification of the building groups and the functional groups (if present) of the thermosetting polymeric network matrix was carried out by FTIR (Fourier Transform Infrared) spectroscopy on a Bruker Tensor 27 Infrared spectrometer (range 4000-700 cm$^{-1}$) equipped with a Golden Gate™ ATR (from Specac) which is a high performance single reflection monolithic diamond ATR system (ATR stands for attenuated total reflection; ATR is a sampling technique used in conjunction with FTIR spectroscopy that enables samples to be examined directly in the solid or liquid state without further preparation). The OPUS data collection software was used to process the spectrographs. The Table A1 below provides for the building groups and the functional groups and their corresponding (and characterizing) wavenumbers.

TABLE A1

Building groups and their corresponding wavenumbers.

| Building Group | Molecular Motion | Wavenumber (cm$^{-1}$) |
|---|---|---|
| Ester group | C=O stretch | 1750-1735 |
| Ether group | C—O—C stretch (dialkyl) | 1300-1000 |
| | C—O—C stretch (diaryl) | ~1250 & ~1120 |
| Amide group | N—H stretch | 3500-3180 |
| | C=O stretch | 1680-1630 |
| | N—H bend | 1640-1550 |
| | N—H bend (1°) | 1570-1515 |
| Urethane group | N—H stretch | 3500-3180 |
| | C=O stretch | 1735-1690 |
| | N—H bend | 1570-1520 |

TABLE A2

Functional groups and their corresponding wavenumbers.

| Functional Group | Molecular Motion | Wavenumber (cm$^{-1}$) |
|---|---|---|
| Hydroxyl group | O—H stretch | ~3650 or 3400-3300 |
| | C—O stretch | 1260-1000 |
| Carboxyl group | O—H stretch | 3400-2400 |
| | C=O stretch | 1730-1700 |
| | C—O stretch | 1320-1210 |
| | O—H bend | 1440-1400 |
| Amino group | N—H stretch (1 per N-H bond) | 3500-3300 |
| | N—H bend | 1640-1500 |
| | C—N Stretch (alkyl) | 1200-1025 |
| Isocyanate group | —N=C=O stretch | ~2270 |
| Epoxy (oxirane) group | C—O stretch of oxirane group (asymetric ring deformation) | 815-950 |
| Ethylenic group (non-aromatic) | =CH stretch | 3100-3010 |
| | C=C stretch (isolated) | 1690-1630 |
| | C=C stretch (conjugated) | 1640-1610 |

6.6 Determination of the Aerobic Char Yield of the Microparticles

The aerobic char yield of the microparticles was determined according to the following method (which for brevity is referred in this specification as 'Pyrolysis' or 'Pyrolysis Method'). The aerobic char yield is expressed as % of solid amount obtained at the end of the pyrolysis.

A clean and empty crucible was weighed to the nearest of 0.1 mg (M1; see below). Subsequently, 1.0 g of microparticles (sample) was loaded to the crucible. The crucible (containing the sample) was weighed to the nearest 0.1 mg (M2; see below). Then, the crucible (containing the sample) was heated in a muffle furnace at 600° C. for 60 minutes under air atmosphere and atmospheric pressure. Subsequently, the crucible was placed in an exicator and was cooled down to room temperature. The crucible was then removed from the exicator and was weighed to the nearest 0.1 mg (M3; see below).

The aerobic char yield of the microparticles was calculated by the following equation:

$$\text{Aerobic Char Yield at 600 } oC \text{ (\% w/w on microparticles)} = \frac{M3 - M1}{M2 - M1} * 100\%$$

wherein

M1=weight of crucible,

M2=aggregate weight of crucible and sample before heating,

M3=aggregate weight of crucible and sample after heating.

If necessary, the chemical composition of the residue is identified by means of FT-IR spectroscopy and/or Scanning Electron Microscopy with Energy Dispersive X-ray Spectroscopy (SEM-EDX). For example, FT-IR spectroscopy is used to identify the type of an inorganic filler or of a pigment present in the residue.

6.7 Determination of the Median Particle Size by Volume Dv50 of the Microparticles The median particle size by volume Dv50 of the microparticles was measured with Mastersizer 3000E laser diffraction particle size analyser for dry, fine-grained powders with range 0.1 µm-3 mm, according to the ISO 13320: 2009 "Particle size analysis—laser diffraction methods".

6.8 Determination of the Storage Modulus G', Loss Modulus G" and $T_g$ of the Microparticles ('Rheometry Method')

The storage modulus G', loss modulus G" and the $T_g$ of the microparticles were measured via rheometry on an Anton Paar MCR301 rheometer equipped with a heating/cooling jacket. The measurements were done with 8 mm spindle with plate-to-plate geometry under air atmosphere.

Pills were prepared form each of the microparticles (inventive and comparative alike) using Norton Pills ICL pill press. 0.1 g of the microparticles was carefully placed between the mould plates of a mould having 13 mm radius. The plunger was placed on top of the top plate of the mould and the mould was put into the press. The mould was immobilized by manually lowering down the screw on the top of the press, until one could not lower it any further by applying manual force. Afterwards, A pressure of 2500 psi was applied by pumping with compressed air; after having applied said pressure for 10 seconds, the pressure was relieved, and the pill was taken out of the mould. The storage modulus G' and loss modulus G' measurements were carried out on an Anton Paar MCR301 rheometer equipped with a heating/cooling cover. The measurements were done with a 8 mm spindle with plate-to-plate geometry. Each of the pills prepared, was placed at 150° C. on the bottom plate of the rheometer, and the spindle was lowered to a measuring position (gap) of 0.5 mm so that full contact between the bottom plate of the rheometer, the pill and the spindle was achieved. The values for G' and G"(Pa·s) were obtained after measuring the viscoelastic properties of the sample (microparticles) in the temperature range from 150° C. to 0° C. with cooling rate 4° C./min under the constant oscillation frequency of 1 Hz and constant normal force of 10 N, so that the contact between the microparticles in the sample, remains intact.

The glass transition temperature ($T_g$) of the microparticles is determined as the temperature at which the loss modulus G" is maximum.

6.9 Determination of the Sphericity $S_{50}$, the Aspect Ratio $A_{50}$ and the Convexity $C_{50}$ of the Microparticles Dynamic image analysis (DIA) is standardized by ISO 13322-2:2006 "Particle size analysis—Image analysis methods"—Part 2: Dynamic image analysis methods.

Each of the $S_{50}$, $A_{50}$ and $C_{50}$ was measured using the SYMPATEC Image Analysis system (IA) QICPIC in combination with the dispersing unit LIXELL using 100 μm cuvette and the mixing and dosing unit LIQXI according ISO 13322-2:2006.

6.10 Calculation of the Average Residence Time

The extruders used in the Examples were co-rotating twin-screw extruders. Thus, the average residence time was calculated according to the following equation B1:

$$\text{Average residence time} = (A/Q_v) + (B/N) \quad \text{(equation B1)}$$

wherein
A=the total filled volume (in cm³) of all the functional zones of the extruder, and
$Q_v$=the volumetric run rate (Kg/hour), and
B=the number of leads in the conveying zones of the extruder, and
N=the rotations per minute (rpm) of the twin-screw divided by 60.

6.11 Determination of the Brunauer-Emmett-Teller (BET) Specific Surface of the Microparticles The BET specific surface of the microparticles was determined according to the ISO 9277:2010.

6.12 Assessment of the Properties of the Coatings 6.12.1 Gloss60°

The gloss measurements at 60° angle (reported in GU which stands for gloss units; (the GU scale of a glossmeter is based on a highly polished, reference black glass standard with a defined refractive index having a specular reflectance of 100 GU at 60° angle) were carried out with BYK micro-TRI-gloss glossmeter in accordance with the ASTM D523-89(2008), on (cured) coatings (on the black part of the Leneta 2C) which were obtained by curing (drying) of their corresponding compositions on the black part of the Leneta 2C (the conditions of drying (curing) are described below). The average value out of three measurements (carried out on the black part of the Leneta 2C) was reported as the gloss60°. The lower the value of gloss60°, the greater the matte finish/appearance of the coating.

6.12.2 Chemical Resistance in Ethanol

The chemical resistance in ethanol (organic solvent) was determined according to the DIN 68861-1A:2011.

Cotton pads (1×1 cm) were soaked with the 48% w/w ethanol solution in water. They were then placed on the coating surface and covered with petri dishes. After 16 h the pads and the petri dishes were removed, and the coatings were immediately visually inspected for damages; the extent of damages were assessed according to the following rating scheme:
5: no visible changes
4: hardly noticeable changes in shine or colour
3: slight changes in shine or colour; the structure of the test surface has not changed
2: heavy changes noticeable; however, the structure of the test surface has remained more or less undamaged.
1: heavy changes noticeable; the structure of the test surface has changed.
0: the tested surface was heavily changed or destroyed.

6.13 Synthesis of the Polyester Resins PR-1 and PR-2

The composition of the polyester resins PR-1, PR-2 refers to a yield of 5.0 Kg of polyester resin.

Each of the polyester resins PR-1 and PR-2 was solid at room temperature and at atmospheric pressure.

6.13.1 Synthesis of the Polyester Resin PR-1

A 6-L reactor vessel fitted with a thermometer, a stirrer and a distillation device for the removal of water formed during the synthesis, was filled with a tin catalyst (butyl stannoic acid, 5 g) and the monomers for the first step [isophthalic acid (1607.7 g, 9.7 mol), neopentyl glycol (1577.5 g, 15.2 mol) and hydrogenated bisphenol A (1356.5 g, 5.65 mol)]. Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. Fumaric acid (1160.6 g, 10 mol) together with a small amount of t-butyl hydroquinone (1.0 g) was added at a temperature of 180° C. followed by esterification at 205° C. (second step). When an acid value of less than 15 mg KOH/g resin was reached, and water stopped being released, the third step of the polyester preparation was carried out under reduced pressure at 205° C. till an acid value of 6.5 mg KOH/g was reached. In order to lower the acid value of the resin below 5 mg KOH/g resin, 2,3-epoxy propyl neodecanoate (38.7 g, 0.15 mol) was added to the resin in order to react with the acid groups of the resin; upon the addition of 2,3-epoxy propyl neodecanoate the reaction continued for at least 30 minutes. Subsequently, the polyester resin was discharged onto an aluminum foil and cool down to room temperature. Afterwards the polyester was grind with Alpine 25 MZ Multi-Purpose Mill from Hosokawa to obtain uniform size 0.15-0.3 cm.

The properties of this isolated polyester resin (which was an unsaturated polyester resin) were: $M_n$=3398 Da, $M_w$=15000 Da, AV=4.3 mg KOH/g resin, OHV=38.6 mg KOH/g.

6.13.2 Synthesis of the Polyester Resin PR-2

A 6-L reactor vessel fitted with a thermometer, a stirrer and a distillation device for the removal of water formed during the synthesis, was filled with a tin catalyst (butyl stannoic acid, 2.5 g), distearyl pentaerythritol diphosphite (4.24 g), and the monomers for the first step, terephthalic acid (2870 g, 17.3 mol), adipic acid (233.9 g, 1.6 mol) ethane diol (201.4 g, 3.2 mol) and neopentyl glycol (1759.2 g, 16.9 mol) Stirring was then applied and a light nitrogen flow was passed over the reaction mixture while the temperature was raised to 250° C.; the temperature was kept at 250° C., till the acid value of less than 8 mg KOH/g resin was achieved. Subsequently, the monomer for the second step, trimellitic acid anhydride (584 g 3.0 mol), was added at a temperature of 180 C. The temperature was then raised to 225° C. After one-hour acid value was determined to be 73.5 mg KOH/g and the resins was discharged onto an aluminum foil and cool down to room temperature. After that the polyester was grind with Alpine 25 MZ Multi-Purpose Mill from Hosokawa to obtain uniform size 0.15-0.3 cm.

The properties of this isolated polyester resin (which was a carboxylic acid functional saturated polyester resin) were: $M_n$=3500 Da, $M_w$=8900 Da, AV=74 mg KOH/g resin, OHV=3.9 mg KOH/g.

This polyester resin has the same composition as the polyester resin shown in Table 4 of WO 2004/026981.

6.14 Preparation of the Liquid Medium LM1

A 4-L flask equipped with a thermometer and overhead stirrer was charged with DMPA (44.0 g, 0.33 mol), Priplast™ 3192 (623.1 g, 0.3 mol), MMA (73.8 g, 0.7 mol), BA (146.2 g, 1.1 mol), IPDI (212.9 g 1.0 mol) and 6,6'-di-tert-butyl-4,4'-butylidenedi-m-cresol (0.33 g). The NCO/OH ratio was 1.50. This mixture was heated to 50° C. and tin octoate (0.16 g) was added. The reaction was allowed to exotherm to 90° C. After the exotherm was complete the reaction was kept at 90° C. for 1 hour and another portion of tin octoate (0.16 g) was added. After that, the reaction temperature was maintained at 90° C. for an additional 1.5 hours. The NCO-content of the isocyanate-terminated pre-polymer was 2.32% w/w (theoretical 2.44% w/w). After cooling the pre-polymer to 75° C., TEA (29.9 g, 0.3 mol) was added. A dispersion of the isocyanate-terminated pre-polymer was made by feeding 950.1 g of the TEA neutralized, isocyanate-terminated pre-polymer over 1 hour to 1615 g of deionized water. The isocyanate-terminated pre-polymer temperature during dispersion was kept at 70° C. and the dispersion temperature was controlled at 25° C. When the pre-polymer feed was completed, a 15.2% w/w hydrazine solution (45.4 g) was added together with water (15.0 g) to effect chain-extension (0.85 SA on residual NCO content; SA has in the specification the meaning of stoichiometric equivalent). Thirty minutes after the addition of the chain extender, a 10% w/w aqueous solution of t-BHPO (9.26 g) was added together with a 1% w/w aqueous solution of FeEDTA (0.92 g). The radical polymerization for producing a polyurethane vinyl hybrid dispersion was executed by feeding a 2.5 w/w aqueous solution (pH adjusted to 8) of iso-ascorbic acid (22.2 g). The batch was filtered through a filter cloth to remove any coagulates formed during the reaction. The solids content of the resultant composition was 35% w/w.

Subsequently, 80 g of Dowanol™ DPnB were mixed (with the help of a Dispermat mixer, at 500 rpm for 5 minutes) with 1400 g of the resultant composition to afford the liquid medium LM1.

The LM1 was used as the liquid medium to prepare the inventive and comparative compositions described further below.

6.15 Preparation of the InvMP1, InvMP2, InvMP3, InvMP4, InvMP5, CompMP1, CompMP2, CompMP3 Microparticles (Tables 1 and 2)

A ZSK Mc[18] twin-screw extruder (available by Coperion) was used for the preparation of the InvMP1 and InvMP2 via a process that comprised of a reactive melt-extrusion step. This is a co-rotating twin-screw extruder.

A PRISM TSE 16 PC twin screw extruder (available by Thermo Electron Corporation) was used for the preparation of the CompMP1 and CompMP2 via a process that comprised of a melt extrusion step and not a reactive melt-extrusion step. This is a co-rotating twin-screw extruder.

6.15.1 Preparation of the InvMP1 (Table 1)

The preparation of the InvMP1 was carried out via a process according to the Process A8 (steps 1-3 and 5-7) described in the specification. More specifically, in a plastic bag, 97 weight parts (2425 g) of the polyester resin PR1 (resin) were mixed with 3 weight parts (75 g) of Trigonox® C-50D (agent; thermal radical initiator; organic peroxide). Then the plastic bag was thoroughly shaken to equally distribute the components, obtaining 2.5 Kg of premix. The reactive extrusion step of the process for the InvPNM1 was carried out on a ZSK Mc[18] twin screw extruder with 10 mm open plate to cover screw points. The extruder had 6 distinct temperature zones. The temperature set up for the different zone was: 120-140-160-180-190-200° C. The stepwise increase was meant to control the possible exothermal reactions that might occur during the processing and the temperatures are high enough for secure high degree of conversion. The rotation speed was set to 650 rpm, and the premix was dosed with external feeder at a volumetric run rate of 2.25 Kg/hour. The residence time was 30 sec. The extrudate (solid powdery material) obtained was collected in an aluminum tray and was cooled down to room temperature. Afterwards, it was grinded with a Hosokawa Alpine multiprocessing system, type AFG 100 equipped with 1.9 mm Laval nozzle. The nozzle pressure was kept at 5.5-6 bar. The classifier speed was set at 6250 rpm.

The properties of the obtained microparticles are shown in Table 1. These microparticles comprised a thermosetting polymeric network matrix which comprised ester groups as building groups and had hydroxyl, carboxyl and ethylenic groups, as functional groups. These microparticles were according to the invention.

6.15.2 Preparation of the InvMP2 (Table 1)

The preparation of the InvMP2 was carried out via a process according to the Process A8 (steps 1-3 and 5-7) described in the specification. More specifically, in a plastic bag, 90 weight parts (2250 g) of the polyester resin PR2 (resin) were mixed with 10 weight parts (250 g) of Primid® XL-552 (agent; crosslinker; β-hydroxyalkyl-amide). Then the plastic bag was thoroughly shaken to equally distribute the components, obtaining 2.5 Kg of premix. The reactive extrusion step of the process for the InvPNM2 was carried out on a ZSK Mc[18] twin screw extruder with 10 mm open plate to cover screw points. The extruder had 6 distinct temperature zones. The temperature set up for the different zone was: 120-140-160-180-190-200. The stepwise increase was meant to control the possible exothermal reactions that might occur during the processing and the temperatures are high enough for secure high degree of conversion. The rotation speed was set to 650 rpm and the premix was dosed with external feeder at a volumetric run rate of 2.25 Kg/hour. The residence time was 30 sec. The extrudate (solid powdery material) obtained was collected in an aluminum tray and was cooled down to room temperature. Afterwards, it was grinded with a Hosokawa Alpine multiprocessing system, type AFG 100 equipped with 1.9 mm Laval nozzle. The nozzle pressure was kept at 5.5-6 bar. The classifier speed was set at 5750 rpm.

The properties of the obtained microparticles are shown in Table 1. These microparticles comprised a thermosetting polymeric network matrix which comprised ester and amide groups as building groups and had hydroxyl and carboxyl groups as functional groups. These microparticles were according to the invention.

6.15.3 Preparation of the InvMP3 (Table 2)

The preparation of the InvMP3 was carried out via a process according to the Process A8 (steps 1-3 and 5-7) described in the specification. More specifically, in a plastic bag, 50 weight parts (1250 g) of the polyester resin PR2 (resin) were mixed with 50 weight parts (1250 g) Araldite®

GT 7004 (agent; polyepoxide) and 25 g of cetyltrimethylammonium bromide. Then the plastic bag was thoroughly shaken to equally distribute the components, obtaining 2.525 Kg of premix. The reactive extrusion step of the process for the InvPNM3 was carried out on a ZSK Mc$^{18}$ twin screw extruder with 10 mm open plate to cover screw points. The extruder had 6 distinct temperature zones. The temperature set up for the different zone was: 120-140-160-180-190-200. The stepwise increase was meant to control the possible exothermal reactions that might occur during the processing and the temperatures are high enough for secure high degree of conversion. The rotation speed was set to 650 rpm and the premix was dosed with external feeder at a volumetric run rate of 2.25 Kg/hour. The residence time was 30 sec. The extrudate (solid powdery material) obtained was collected in an aluminum tray and was cooled down to room temperature. Afterwards, it was grinded with a Hosokawa Alpine multiprocessing system, type AFG 100 equipped with 1.9 mm Laval nozzle. The nozzle pressure was kept at 5.5-6 bar. The classifier speed was set at 6150 rpm. The properties of the obtained microparticles are shown in Table 2.

These microparticles comprised a thermosetting polymeric network matrix which comprised ester and ether groups as building groups and had hydroxyl, carboxyl and epoxy groups as functional groups. These microparticles were according to the invention.

6.15.4 Preparation of the InvMP4 (Table 2)

The preparation of the InvMP4 was carried out via a process according to the Process A8 (steps 1-3 and 5-7) described in the specification. More specifically, in a plastic bag, 97 weight parts (2425 g) of the polyester resin PR1 (resin) were mixed with 3 weight parts (75 g) of Trigonox® C-50D (agent; thermal radical initiator; organic peroxide). Then the plastic bag was thoroughly shaken to equally distribute the components, obtaining 2.5 Kg of premix. The reactive extrusion step of the process for the InvPNM4 was carried out on a ZSK Mc$^{18}$ twin screw extruder with 10 mm open plate to cover screw points. The extruder had 6 distinct temperature zones. The temperature set up for the different zone was: 120-140-160-180-190-200° C. The stepwise increase was meant to control the possible exothermal reactions that might occur during the processing and the temperatures are high enough for secure high degree of conversion. The rotation speed was set to 650 rpm, and the premix was dosed with external feeder at a volumetric run rate of 2.25 Kg/hour. The residence time was 30 sec. The extrudate (solid powdery material) obtained was collected in an aluminum tray and was cooled down to room temperature. Afterwards, it was grinded with a Hosokawa Alpine multiprocessing system, type AFG 100 equipped with 1.9 mm Laval nozzle. The nozzle pressure was kept at 5.5-6 bar. The classifier speed was set at 12500 rpm.

The properties of the obtained microparticles are shown in Table 2. These microparticles comprised a thermosetting polymeric network matrix which comprised ester groups as building groups and had hydroxyl, carboxyl and ethylenic groups, as functional groups. These microparticles were according to the invention.

6.15.5 Preparation of the InvMP5 (Table 2)

The preparation of the InvMP5 was carried out via a process according to the Process A8 (steps 1-3 and 5-7) described in the specification. More specifically, in a plastic bag, 97 weight parts (2425 g) of the polyester resin PR1 (resin) were mixed with 3 weight parts (75 g) of Trigonox® C-50D (agent; thermal radical initiator; organic peroxide). Then the plastic bag was thoroughly shaken to equally distribute the components, obtaining 2.5 Kg of premix. The reactive extrusion step of the process for the InvPNM5 was carried out on a ZSK Mc$^{18}$ twin screw extruder with 10 mm open plate to cover screw points. The extruder had 6 distinct temperature zones. The temperature set up for the different zone was: 120-140-160-180-190-200° C. The stepwise increase was meant to control the possible exothermal reactions that might occur during the processing and the temperatures are high enough for secure high degree of conversion. The rotation speed was set to 650 rpm, and the premix was dosed with external feeder at a volumetric run rate of 2.25 Kg/hour. The residence time was 30 sec. The extrudate (solid powdery material) obtained was collected in an aluminum tray and was cooled down to room temperature. Afterwards, it was grinded with a Hosokawa Alpine multiprocessing system, type AFG 100 equipped with 1.9 mm Laval nozzle. The nozzle pressure was kept at 5.5-6 bar. The classifier speed was set at 2000 rpm.

The properties of the obtained microparticles are shown in Table 2. These microparticles comprised a thermosetting polymeric network matrix which comprised ester groups as building groups and had hydroxyl, carboxyl and ethylenic groups, as functional groups. These microparticles were according to the invention.

6.15.6 Preparation of the CompMP1 (Table 1)

The preparation of the CompMP1 was carried out via a melt extrusion process. In a plastic bag, 97 weight parts (2425 g) of the polyester resin PR1 were mixed with 3 weight parts (75 g) of Trigonox® C-50D. Then the plastic bag was thoroughly shaken to equally distribute the components, obtaining 2.5 Kg of premix. Subsequently, the premix was melt-extruded in a PRISM TSE 16 PC twin screw extruder with screw speed 300 rpm at 60° C. The extruder had one temperature zone set at 60° C. The premix was dosed with external feeder at a volumetric run rate of 2.25 Kg/hour. The residence time was 15 sec. The liquid extrudate was let over cooling walls and allowed to solidify. After it was cool down to room temperature it was broken into chips. After that it was grinded with Hosokawa Alpine multiprocessing system, type AFG 100 equipped with 1.9 mm Laval nozzle. The nozzle pressure was kept at 5.5-6 bar. The classifier speed was set at 5200 rpm.

The properties of the obtained microparticles are shown in Table 1. These microparticles comprised a polymeric matrix which comprised ester groups as building groups and also had hydroxyl, carboxyl and ethylenic groups, as functional groups. These microparticles were not according to the invention.

6.15.7 Preparation of the CompMP2 (Table 1)

The preparation of the CompMP2 was carried out via a melt extrusion process. In a plastic bag, 90 weight parts (2250 g) of the polyester resin PR2 were mixed with 10 weight parts (250 g) of Primid® XL-552. Then the plastic bag was thoroughly shaken to equally distribute the components, obtaining 2.5 Kg of premix. Subsequently, the premix was melt-extruded in a PRISM TSE 16 PC twin screw extruder with screw speed 300 rpm at 120° C. The extruder had one temperature zone set at 120° C. The premix was dosed with external feeder at a volumetric run rate of 2.25 Kg/hour. The residence time was 15 sec. The liquid extrudate was let over cooling walls and allowed to solidify. After it was cool down to room temperature it was broken into chips. After that it was grinded with Hosokawa Alpine multiprocessing system, type AFG 100 equipped with 1.9 mm Laval nozzle. The nozzle pressure was kept at 5.5-6 bar. The classifier speed was set at 5200 rpm.

The properties of the obtained microparticles are shown in Table 1. These microparticles comprised a polymeric matrix which comprised ester and amide groups as building groups and also had hydroxyl and carboxyl groups, as functional groups. These microparticles were not according to the invention.

6.15.8 Preparation of the CompMP3 (Table 2)

The preparation of the CompMP3 was carried out via a process according to the Process A8 (steps 1-3 and 5-7) described in the specification. More specifically, in a plastic bag, 50 weight parts (1250 g) of the polyester resin PR2 (resin) were mixed with 50 weight parts (1250 g) Araldite® GT 7004 and 25 grams of cetyltrimethylammonium bromide. Then the plastic bag was thoroughly shaken to equally distribute the components, obtaining 2.525 Kg of premix. Subsequently, the premix was melt-extruded in a PRISM TSE 16 PC twin screw extruder with screw speed 300 rpm at 120° C. The extruder had one temperature zone set at 120° C. The premix was dosed with external feeder at a volumetric run rate of 2.25 Kg/hour. The residence time was 15 sec. The liquid extrudate was let over cooling walls and allowed to solidify. After it was cool down to room temperature it was broken into chips. After that it was grinded with Hosokawa Alpine multiprocessing system, type AFG 100 equipped with 1.9 mm Laval nozzle. The nozzle pressure was kept at 5.5-6 bar. The classifier speed was set at 5000 rpm.

The properties of the obtained microparticles are shown in Table 2. These microparticles comprised a thermosetting polymeric network matrix which comprised ester and ether groups as building groups and had hydroxyl, carboxyl and epoxy groups as functional groups. These microparticles were not according to the invention.

6.16 Preparation of the Compositions InvMP1-C1, InvMP2-C2, InvMP3-C3, InvMP4-C4, InvMP5-05, CompMP1-C1, CompMP2-C2, CompMP3-C3 (Tables 1 and 2)

All the compositions (inventive and comparative) shown in the Examples were liquid (aqueous coating) compositions.

6.16.1 Preparation of the InvMP1-C1

96 g of the LM1 and 4 g of the InvMP1 were charged into a 400 mL plastic pot and were mixed with the help of a Dispermat mixer R11, for 5 minutes at 1000 rpm. The resulting mixture was the InvMP1-C1 composition (Table 1).

6.16.2 Preparation of the InvMP2-C2

96 g of the LM1 and 4 g of the InvMP2 were charged into a 400 mL plastic pot and were mixed with the help of a Dispermat mixer R11, for 5 minutes at 1000 rpm. The resulting mixture was the InvMP2-C2 composition (Table 1).

6.16.3 Preparation of the InvMP3-C3

96 g of the LM1 and 4 g of the InvMP3 were charged into a 400 mL plastic pot and were mixed with the help of a Dispermat mixer R11, for 5 minutes at 1000 rpm. The resulting mixture was the InvMP3-C3 composition (Table 2).

6.16.4 Preparation of the InvMP4-C4

96 g of the LM1 and 4 g of the InvMP4 were charged into a 400 mL plastic pot and were mixed with the help of a Dispermat mixer R11, for 5 minutes at 1000 rpm. The resulting mixture was the InvMP4-C4 composition (Table 2).

6.16.5 Preparation of the InvMP5-C5

96 g of the LM1 and 4 g of the InvMP5 were charged into a 400 mL plastic pot and were mixed with the help of a Dispermat mixer R11, for 5 minutes at 1000 rpm. The resulting mixture was the InvMP5-C5 composition (Table 2).

6.16.6 Preparation of the CompMP1-C1

96 g of the LM1 and 4 g of the CompMP1 were charged into a 400 mL plastic pot and were mixed with the help of a Dispermat mixer R11 for 5 minutes at 1000 rpm. The resulting mixture was the CompMP1-C1 composition (Table 1).

6.16.7 Preparation of the CompMP2-C2

96 g of the LM1 and 4 g of the CompMP2 were charged into a 400 mL plastic pot and were mixed with the help of a Dispermat mixer R11, for 5 minutes at 1000 rpm. The resulting mixture was the CompMP2-C2 composition (Table 1).

6.16.8 Preparation of the CompMP3-C3

96 g of the LM1 and 4 g of the CompMP3 were charged into a 400 mL plastic pot and were mixed with the help of a Dispermat mixer R11, for 5 minutes at 1000 rpm. The resulting mixture was the CompMP3-C3 composition (Table 2).

6.17 Preparation of the Coatings InvMP1-CT1, InvMP2-CT2, InvMP3-CT3, InvMP4-CT4, InvMP5-CT5, CompMP1-CT1, CompMP2-CT 2, CompMP3-CT3 Prepared Upon Curing of their Corresponding Liquid (Aqueous Coating) Compositions (Tables 1 and 2)

6.17.1 Preparation of the InvMP1-CT1 (Table 1)

InvMP1-C1 was applied on Leneta charts form 2C with a wire rod 100 μm (1 micron=1 μm=$10^{-6}$ m) within 1 h from the lapse of 24 h from its preparation. The coating was allowed to dry (cure) [standard conditions—as these are defined in the specification—relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 1).

6.17.2 Preparation of the InvMP2-CT2 (Table 1)

InvMP2-C2 was applied on Leneta charts form 2C with a wire rod 100 μm (1 micron=$10^{-6}$m) within 1 h from the lapse of 24 h from its preparation. The coating was allowed to dry (cure) [standard conditions—as these are defined in the specification-relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 1).

6.17.3 Preparation of the InvMP3-CT3 (Table 2)

InvMP3-C3 was applied on Leneta charts form 2C with a wire rod 100 μm (1 micron=1 μm=$10^{-6}$ m) within 1 h from the lapse of 24 h from its preparation. The coating was allowed to dry (cure) [standard conditions—as these are defined in the specification—relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 2)

6.17.4 Preparation of the InvMP4-CT4 (Table 2)

InvMP4-C4 was applied on Leneta charts form 2C with a wire rod 100 μm (1 micron=1 μm=$10^{-6}$ m) within 1 h from the lapse of 24 h from its preparation. The coating was allowed to dry (cure) [standard conditions—as these are defined in the specification—relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 2).

6.17.5 Preparation of the InvMP5-CT5 (Table 2)

InvMP5-05 was applied on Leneta charts form 2C with a wire rod 100 μm (1 micron=1 μm=$10^{-6}$ m) within 1 h from the lapse of 24 h from its preparation. The coating was allowed to dry (cure) [standard conditions—as these are defined in the specification—relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 2).

6.17.6 Preparation of the CompMP1-CT1 (Table 1)

CompMP1-C1 was applied on Leneta charts form 2C with a wire rod 100 μm (1 micron=$10^{-6}$ m) within 1 h from the lapse of 24 h from its preparation. The coating was allowed to dry (cure) [standard conditions—as these are defined in the specification—, relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 1).

6.17.7 Preparation of the CompMP2-CT2 (Table 1)

CompMP2-C2 was applied on Leneta charts form 2C with a wire rod 100 μm (1 micron=$10^{-6}$ m) within 1 h from the lapse of 24 h from its preparation. The coating was allowed to dry (cure) [standard conditions—as these are defined in the specification—, relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 1).

6.17.8 Preparation of the CompMP3-CT3 (Table 2)

CompMP3-C3 was applied on Leneta charts form 2C with a wire rod 100 μm (1 micron=1 μm=$10^{-6}$ m) within 1 h from the lapse of 24 h from its preparation. The coating was allowed to dry (cure) [standard conditions—as these are defined in the specification—relative humidity of 50±1 and an airflow of 0.1 m/s), for 168 h. Upon the lapse of the 168 h and within 24 h from the lapse of the 168 h, the gloss60° and the chemical resistance were measured as these were described in the specification (Table 2).

TABLE 1

Inventive and comparative examples

| Microparticles | Inventive Microparticles | | Comparative Microparticles | |
| --- | --- | --- | --- | --- |
| | InvMP1 | InMP2 | CompMP1 | CompMP2 |
| Porosity (%) | <0.95 | <0.95 | <0.95 | <0.95 |
| Thermosetting polymeric network matrix | Yes | Yes | No | No |
| Random architecture | Yes | Yes | Yes | Yes |
| Median particle size by volume MO (micron) | 10 | 10 | 10 | 10 |
| Meltingtemperature ($T_m$) (° C.) | No | No | No | No |
| Glass transition temperature $T_g$ (° C.) | 77 | 72 | 54 | 54 |
| Storage modulus G' at 130° C. (Pa.s) | $3.6 \times 10^5$ | $3.1 \times 10^5$ | 158 | 160 |
| Rubbery plateau | Yes | Yes | No | No |
| Sphericity $S_{50}$ | 0.69 | 0.66 | 0.68 | 0.68 |
| Aspect ratio $A_{50}$ | 0.68 | 0.66 | 0.67 | 0.67 |
| Convexity $C_{50}$ | 0.63 | 0.66 | 068 | 0.68 |
| Brunauer-Emmet-Teller specific surface (m²/g) | 10 | 12 | 12 | 16 |
| Aerooic char yield at 600° C. (%) | 15 | 0 | 1.5 | 0 |
| Liquid Compositions (aqueous coating compositions) | Inventive Compositions | | Comparative Compositions | |
| | InvMP1-CT1 | InvMP2-CT2 | CompMP1-CT1 | CompMP2-CT2 |
| Coatings & Properties | Inventive Coatings | | Comparative Coatings | |
| | InvMP1-CT1 | InvMP2-CT2 | CompMP1-CT1 | CompMP2-CT2 |
| Gloss60° | 38 | 30 | 77 | 71 |
| Chemical resistance in BOH 48% ww (16 hours) | 5 | 5 | 1 | 1 |
| Matte coating | Yes | Yes | No | No |
| Chemical resistance in aggressive organic solvents | Excellent | Excellent | Poor | Poor |

TABLE 2

Inventive and comparative examples

| Microparticles | Comparative Microparticles | Inventive Microparticles | | |
| --- | --- | --- | --- | --- |
| | CompMP3 | InvMP3 | InvMP4 | InvMP5 |
| Porosity (%) | <0.95 | <0.95 | <0.95 | <0.95 |
| Thermosetting polymeric network matrix | No | Yes | Yes | Yes |
| Random architecture | Yes | Yes | Yes | Yes |
| Median particle size by volume Dv50 (micron) | 10 | 10 | 5 | 29 |
| Melting temperature ($T_m$) (° C.) | No | No | No | No |
| Glass transition temperature $T_g$ (° C.) | 58 | 79 | 77 | 11 |
| Storage modulus G' at 130° C. (Pa.s) | 125 | $3.8 \times 10^5$ | $3.6 \times 10^5$ | $3.6 \times 10^5$ |
| Rubbery plateau | No | Yes | Yes | Yes |
| Spheicty $S_{50}$ | 0.66 | 066 | 0.69 | 0.69 |
| Aspect ratio $A_{50}$ | 067 | 066 | 0.68 | 069 |

TABLE 2-continued

Inventive and comparative examples

| Microparticles | Comparative Microparticles | Inventive Microparticles | | |
|---|---|---|---|---|
| | CompMP3 | InvMP3 | InvMP4 | InvMP5 |
| Convexity $C_{50}$ | 063 | 0.66 | 069 | 0.68 |
| Brunauer-Emmet-Teller specific surface (m$^2$/g) | 15 | 12 | 1.1 | 08 |
| Aerobic char yed at 600° C. (%) | 0 | 0 | 1.5 | 1.5 |
| Liquid Compositions (aqueous coating compositions) | Comparative Compositions | Inventive Compositions | | |
| | CompMP3-C3 | InvMP3-C3 | InvMP4-C4 | InvMP5-C5 |
| Coatings & Properties | Comparative Coatings | Inventive Coatings | | |
| | CompMP3-CT3 | InvMP3-CT3 | InvMP4-CT4 | InvMP5-CT5 |
| Gloss60° | 70 | 37 | 38 | 28 |
| Chemical resistance in EtOH 48% w/w (16 hours) | 1 | 5 | 5 | 5 |
| Matte coating | No | Yes | Yes | Yes |
| Chemical resistance in aggressive organic solvents | Poor | Excellent | Excellent | Excellent |

The examples of WO 2019/170854 A1 (including examples 4, 6, 7 and 8) and the examples of the US 2004/0110907 A1 (equivalent to EP 1426423 A1 and to DE 10257217 A1) (including the examples 1 and 4) were worked out for as far as it concerns obtaining the (uncured) powder coating compositions (also known as powders). These were further examples of effectively comparative (not according to the invention) microparticles; the microparticles of the WO 2019/170854 A1 were prepared using the process disclosed in the WO 2019/170854 A1; the microparticles of the US 2004/0110907 A1 were also prepared according to the process disclosed in WO 2019/170854 A1. Some of the properties of the microparticles of the WO 2019/170854 A1; and the US 2004/0110907 A1 were determined; the methods used to assess those properties of the microparticles of the WO 2019/170854 A1 and the US 2004/0110907 A1 were the same as disclosed in the specification for the Examples shown in Tables 1 and 2. The comparative microparticles (powders) prepared from the WO 2019/170854 A1 and US 2004/0110907 A1 were introduced into liquid (aqueous coating) compositions using the same liquid medium (the LM1) that was used for the preparation of the liquid (aqueous coating) compositions shown in Tables 1 and 2, and said comparative (not according to the invention) liquid (aqueous coating) compositions were applied to form (cured) coatings similarly as the (cured) coatings shown in Tables 1 and 2. The (cured) coating properties [gloss60° and chemical resistance in EtOH 48% w/w (16 hours)] were assessed according to the methods shown in the Examples of this specification. The microparticles of all of the examples of WO 2019/170854 A1 and US 2004/0110907 A1 had a Dv50 (determined via laser diffraction according to the ISO 13320:2009) of at least 45 and at most 90 μm. The microparticles of all of the examples of WO 2019/170854 A1 and US 2004/0110907 A1 had at least the following differences from the microparticles of the invention: a) none of them had a thermosetting polymeric matrix as this is defined in the specification, b) none of them had a rubbery plateau as this is defined in the specification, and c) none of them had a storage modulus G' (at 130° C.) of at least 10$^5$ Pa·s (actually the G' of all of these examples ranged in the area of 100 to 500 Pa·s). In addition, the microparticles of all the examples of US 2004/0110907 A1 had a $T_m$ (this was not according to the invention) and a $T_g$ 40° C. (outside the claimed range for the microparticles of the invention). All the examples of the WO 2019/170854 A1 had a $T_g$ in the range of 48 to 55° C. These differences alone represented very different particles from the microparticles of the invention. The chemical resistance in EtOH 48% w/w (16 hours) of these comparative (not according to the invention) (cured) coatings derived from the comparative (not according to the invention) liquid (aqueous coating) compositions comprising the comparative (not according to the invention) microparticles of the WO 2019/170854 A1 and US 2004/0110907 A1, was equal to 1, thus poor. The gloss60° of these comparative (not according to the invention) (cured) coatings derived from the comparative (not according to the invention) liquid (aqueous coating) compositions comprising the comparative (not according to the invention) microparticles of the WO 2019/170854 A1 and US 2004/0110907 A1, ranged from 60 to 80 gloss units (thus none of them afforded matt coatings derived upon curing of their corresponding liquid (aqueous coating) compositions; the coatings derived upon curing of their corresponding liquid (aqueous coating) compositions were high gloss (also known as glossy coatings).

From the results shown in the Tables 1 and 2 and the examples of WO 2019/170854 A1 (all of which were not according to the invention) and US 2004/0110907 A1 (all of which were not according to the invention), it is evident that only the microparticles according to the claimed invention provided a solution for preparing (cured) coatings combining low gloss60° (as this is defined in the specification; see Definitions), and good—preferably very good, more preferably excellent—chemical resistance in aggressive organic solvents (as this is defined in the specification; see Definitions). More particularly, only when the microparticles of the invention were used in liquid (aqueous coating) compositions, the latter afforded—upon curing—matte coatings having excellent chemical resistance in aggressive organic solvents.

When comparative microparticles (that is to say microparticles not according to the claimed invention) were used in liquid (aqueous coating) compositions, the latter failed not only to afford—upon curing—matte coatings (they actually afforded high-gloss (glossy) (cured) coatings) but also the chemical resistance in aggressive organic solvents of said comparative (not according to the invention) (cured) coatings was poor.

The invention claimed is:
1. Microparticles which:
   a. are non-porous that is to mean that the microparticles have a porosity determined via mercury porosimetry according to ISO 15901-1:2005, of at most 10%; and
   b. comprise a thermosetting polymeric network matrix which thermosetting polymeric network matrix comprises building groups selected from the group consisting of ester groups, ether groups, amide groups, urethane groups, and combinations thereof, and
   c. have a random architecture, that is to mean that the microparticles have neither a core-shell architecture, nor a multi-layered architecture, nor an occluded architecture, nor a partially engulfed architecture, nor any combination thereof, and
   d. have a particle size distribution with a median particle size by volume Dv50 as determined via laser diffraction according to the ISO 13320:2009, of at least 1 and at most 850 μm, and
   e. do not have a melting temperature as determined via Differential Scanning calorimetry, and
   f. have a glass transition temperature as determined via rheometry of at least 45 and at most 150° C., and
   g. have a storage modulus G' at 130° C. as determined via rheometry of at least $10^5$ Pa·s and at most $10^9$ Pa·s, and
   h. have a rubbery plateau between 130 and 200° C. as determined via rheometry, and
   i. have a sphericity $S_{50}$ as determined according to the ISO 13322-2:2006 of at least 0.05 and at most 0.95, and
   j. have an aspect ratio $A_{50}$ as determined according to the ISO 13322-2:2006 of at least 0.05 and at most 0.95, and
   k. have a convexity $C_{50}$ as determined according to the ISO 13322-2:2006 of at least 0.05 and at most 0.95, and
   l. Have a Brunauer-Emmett-Teller specific surface as determined according to the ISO 9277:2010, of at least 0.01 and at most 15 m²/g, and
   m. have an aerobic char yield at 600° C., as determined via pyrolysis of at most 70% w/w on microparticles.
2. The microparticles as claimed in claim 1, wherein the thermosetting polymeric network matrix further comprises functional groups selected from the group consisting of hydroxyl groups, carboxyl groups, amino groups, isocyanate groups, epoxy groups, ethylenic groups, and any combination thereof.
3. The microparticles as claimed in claim 1, wherein the microparticles
   a. are non-porous that is to mean that the microparticles have a porosity of at most 5%; and
   f. have a glass transition temperature (Tg) of at least 45 and at most 150° C., and
   g. have a storage modulus G' at 130° C. of at least $10^5$ Pa·s and at most $10^8$ Pa·s, and
   i. have a sphericity $S_{50}$ of at least 0.40 and at most 0.80, and
   j. have an aspect ratio $A_{50}$ of at least 0.40 and at most 0.80, and
   k. have a convexity $C_{50}$ of at least 0.40 and at most 0.80, and
   l. have a Brunauer-Emmett-Teller specific surface of at least 0.01 and at most 10 m²/g, and
   m. have an aerobic char yield at 600° C. of at most 40% w/w on microparticles.
4. The microparticles as claimed in claim 1, wherein the microparticles have a particle size distribution with a median particle size by volume Dv50 of at least 1 and at most 30 μm, and a glass transition temperature of at least 60 and at most 150° C.
5. The microparticles as claimed in claim 1, wherein the microparticles have a particle size distribution with a median particle size by volume Dv50 of at least 30 and at most 150 μm, and a glass transition temperature of at least 50 and at most 150° C.
6. The microparticles as claimed in claim 1, wherein the microparticles have a particle size distribution with a median particle size by volume Dv50 of at least 200 and at most 850 μm, and a glass transition temperature of at least 45 and at most 150° C.
7. A composition comprising:
   i) microparticles as claimed in claim 1; and
   ii) medium, wherein the medium is selected from the group consisting of gases, liquids, solids and combinations thereof.
8. A cured composition obtained by curing the composition as claimed in claim 7.
9. An object or a kit-of-parts comprising microparticles as claimed in claim 1.
10. A process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, or storage energy devices, wherein the process comprises the step of providing microparticles as claimed in claim 1.
11. The microparticles as claimed in claim 1, wherein the microparticles have
   a particle size distribution with a median particle size by volume Dv50 as determined via laser diffraction according to the ISO 13320:2009 of at least 1 and at most 350 μm.
12. An object or a kit-of-parts comprising the composition as claimed in claim 7.
13. An object or a kit-of-parts comprising the cured composition as claimed in claim 8.
14. A process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, or storage energy devices, wherein the process comprises the step of providing the composition as claimed in claim 7.
15. A process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, or storage energy devices, wherein the process comprises the step of providing the cured composition as claimed in claim 8.
16. A process for making paints, coatings, films, adhesives, waxes, matting agents, absorbents, cans, coils, 3D-printed articles, automotive articles, marine articles, aerospace articles, medical articles, defense articles, sports/recreational articles, architectural articles, bottling articles, household articles, machinery, textiles, electrical devices, energy devices, or storage energy devices, wherein the process comprises the step of providing objects and/or a kit-of-parts as claimed as in claim 9.

17. The microparticles as claimed in claim 1, wherein the microparticles have an aerobic char yield at 600° C. of at most 40% w/w on microparticles.

18. The microparticles as claimed in claim 3, wherein the microparticles have an aerobic char yield at 600° C. of at most 10% w/w on microparticles.

19. The composition of claim 7, wherein the thermosetting polymeric network matrix of the microparticles further comprises functional groups selected from the group consisting of hydroxyl groups, carboxyl groups, amino groups, isocyanate groups, epoxy groups, ethylenic groups, and any combination thereof, wherein the medium is able to react with at least one of the functional groups of the thermosetting polymeric network matrix.

20. A cured composition obtained by curing the composition as claimed in claim 19.

21. An object or a kit-of-parts comprising the composition as claimed in claim 19.

22. An object or a kit-of-parts comprising the cured composition as claimed in claim 20.

* * * * *